United States Patent
Simeonov et al.

(10) Patent No.: US 10,007,933 B2
(45) Date of Patent: *Jun. 26, 2018

(54) SYSTEMS AND METHODS FOR INTEGRATING DYNAMIC CONTENT INTO ELECTRONIC MEDIA

(71) Applicant: Swoop Inc., Cambridge, MA (US)

(72) Inventors: Simeon Simeonov, Lincoln, MA (US); James Echmalian, Arlington, MA (US); Yongdeng Chen, Cambridge, MA (US); James R. Morrin, Jr., Cambridge, MA (US); Tyler Morrison, Corbett, OR (US); Joseph R. Ferris, Cambridge, MA (US)

(73) Assignee: Swoop Inc., Cambridge, MA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/514,018

(22) Filed: Oct. 14, 2014

(65) Prior Publication Data

US 2015/0220492 A1 Aug. 6, 2015

Related U.S. Application Data

(63) Continuation-in-part of application No. 13/774,725, filed on Feb. 22, 2013, now Pat. No. 9,830,304.

(51) Int. Cl.
*G06F 15/16* (2006.01)
*G06Q 30/02* (2012.01)
(Continued)

(52) U.S. Cl.
CPC ....... *G06Q 30/0277* (2013.01); *G06F 17/227* (2013.01); *G06F 17/2229* (2013.01); *G06F 17/2247* (2013.01); *G06F 17/30893* (2013.01)

(58) Field of Classification Search
CPC .. G06F 17/211; G06F 17/2247; G06F 17/248; G06F 17/30893; G06F 17/2229; G06F 17/227; G06Q 30/0277
(Continued)

(56) References Cited

U.S. PATENT DOCUMENTS 5,933,811 A * 8/1999 Angles ............... G06Q 30/02
705/14.56
6,721,713 B1 * 4/2004 Guheen ............... G06Q 99/00
705/1.1
(Continued)

*Primary Examiner* — Scott T Baderman
*Assistant Examiner* — Hassan Mrabi
(74) *Attorney, Agent, or Firm* — Goodwin Procter LLP

(57) ABSTRACT

Embodiments of the invention provide methods and supporting systems for programmatically inserting highly-relevant content ("inserted content" or "display items") into existing electronic content ("native content") such as websites and WAP-enabled domains. The addition of the content considers various attributes of the native content into which the inserted content is to be placed, the user viewing the content, the device on which the content is being placed, the structure of the content, metadata related to the content and/or the content domain, the inserted content itself, as well as many other attributes that may be specific to the instance, or, in some cases, may even be random. The insertion process also uses an insertion strategy to direct how, when and in what form the inserted content is placed into the native content. The dynamic placement includes of creating a content display slot within the content at which display items may be incorporated into the content wherein the content display slot is not defined in the native content and is based at least in part on attributes of the content structure.

58 Claims, 6 Drawing Sheets

(51) Int. Cl.
*G06F 17/30* (2006.01)
*G06F 17/22* (2006.01)

(58) Field of Classification Search
USPC .................. 715/201, 202, 243, 760
See application file for complete search history.

(56) References Cited

U.S. PATENT DOCUMENTS

| | | | | |
|---|---|---|---|---|
| 6,826,727 | B1* | 11/2004 | Mohr | G06F 17/211 |
| | | | | 382/180 |
| 7,316,003 | B1* | 1/2008 | Dulepet | G06F 17/218 |
| | | | | 717/110 |
| 7,555,710 | B2* | 6/2009 | Kobashi | G06F 17/248 |
| | | | | 715/243 |
| 7,596,746 | B2* | 9/2009 | Kobashi | G06F 17/248 |
| | | | | 715/235 |
| 7,620,903 | B1* | 11/2009 | Rasmussen | G06F 9/4443 |
| | | | | 715/744 |
| 7,707,495 | B2* | 4/2010 | Hosotsubo | G06F 17/248 |
| | | | | 715/234 |
| 7,761,791 | B2* | 7/2010 | Kobashi | G06F 17/2288 |
| | | | | 715/243 |
| 7,805,672 | B2* | 9/2010 | Kobashi | G06F 17/212 |
| | | | | 715/243 |
| 7,853,872 | B2* | 12/2010 | Ota | G06F 17/217 |
| | | | | 715/209 |
| 8,086,958 | B2* | 12/2011 | Tokunaga | G06F 17/211 |
| | | | | 715/205 |
| 8,370,732 | B2* | 2/2013 | Black | H04L 67/1008 |
| | | | | 715/201 |
| 8,370,738 | B2* | 2/2013 | Osaka | G06F 17/217 |
| | | | | 715/227 |
| 8,464,151 | B2* | 6/2013 | Miyazawa | G06F 17/243 |
| | | | | 715/243 |
| 8,799,756 | B2* | 8/2014 | Grosz | G06F 3/1242 |
| | | | | 382/118 |
| 8,935,608 | B2* | 1/2015 | Yoshida | G06F 17/30716 |
| | | | | 715/243 |
| 8,954,843 | B2* | 2/2015 | Morooka | G06F 3/1208 |
| | | | | 715/243 |
| 2002/0095332 | A1* | 7/2002 | Doherty | G06Q 30/02 |
| | | | | 705/14.53 |
| 2002/0147638 | A1* | 10/2002 | Banerjee | G06Q 30/0255 |
| | | | | 705/14.53 |
| 2003/0050931 | A1* | 3/2003 | Harman | G06F 17/30905 |
| 2003/0222901 | A1* | 12/2003 | Houck | G06F 17/30861 |
| | | | | 715/738 |
| 2003/0225839 | A1* | 12/2003 | Kopunovic | G06Q 10/10 |
| | | | | 709/206 |
| 2004/0123238 | A1* | 6/2004 | Hefetz | G06F 9/4443 |
| | | | | 715/234 |
| 2005/0187895 | A1* | 8/2005 | Paya | G06F 17/3089 |
| 2006/0265657 | A1* | 11/2006 | Gilley | G06Q 30/02 |
| | | | | 715/730 |
| 2007/0198534 | A1* | 8/2007 | Hon | G06F 17/30058 |
| 2007/0250901 | A1* | 10/2007 | McIntire | H04N 7/17318 |
| | | | | 725/146 |
| 2009/0234734 | A1* | 9/2009 | Gollapudi | G06Q 30/02 |
| | | | | 705/14.54 |
| 2010/0095155 | A1* | 4/2010 | Tsun | G06F 17/30011 |
| | | | | 714/32 |
| 2010/0122158 | A1* | 5/2010 | Tarumi | G06F 17/211 |
| | | | | 715/243 |
| 2010/0145794 | A1* | 6/2010 | Barger | G06F 17/30867 |
| | | | | 705/14.45 |
| 2010/0235468 | A1* | 9/2010 | Cobb | G06Q 30/02 |
| | | | | 709/218 |
| 2010/0293049 | A1* | 11/2010 | Maher | G06F 17/30699 |
| | | | | 705/14.46 |
| 2011/0219076 | A1* | 9/2011 | Roope | G06F 15/16 |
| | | | | 709/205 |
| 2011/0289582 | A1* | 11/2011 | Kejriwal | G06F 21/566 |
| | | | | 726/22 |
| 2012/0010995 | A1* | 1/2012 | Skirpa | G06F 3/0481 |
| | | | | 705/14.49 |
| 2012/0036427 | A1* | 2/2012 | Osaka | G06F 17/211 |
| | | | | 715/243 |
| 2012/0246017 | A1* | 9/2012 | Kleber | G06Q 30/02 |
| | | | | 705/14.73 |
| 2013/0006866 | A1* | 1/2013 | Pendakur | G06Q 30/0241 |
| | | | | 705/50 |
| 2013/0198658 | A1* | 8/2013 | Mokhtarzada | G06F 3/048 |
| | | | | 715/760 |
| 2014/0006931 | A1* | 1/2014 | Pettitt | H04L 67/26 |
| | | | | 715/234 |
| 2014/0143806 | A1* | 5/2014 | Steinberg | H04N 21/23424 |
| | | | | 725/34 |
| 2015/0220990 | A1* | 8/2015 | Kobyakov | G06Q 30/0241 |
| | | | | 705/14.6 |

* cited by examiner

SYSTEMS AND METHODS FOR INTEGRATING DYNAMIC CONTENT INTO ELECTRONIC MEDIA

CROSS REVERENCE TO RELATED APPLICATIONS

This application is a continuation in part of and claims the priority to and the benefit of currently pending U.S. patent application Ser. No. 13/774,725, entitled "Systems and Methods for Integrating Dynamic Content into Electronic Media" filed on Feb. 22, 2013, the entire disclosure of which is incorporated herein.

TECHNICAL FIELD

This invention relates to methods and systems for adding content into electronic media, and, more particularly, for identifying and presenting text, images, video and other information into dynamically created placements within existing content such that the content is displayed in a manner that does not interfere with, and in many cases enhances, the user experience.

BACKGROUND

The use of the Internet has become the de facto standard for information delivery, retrieval and research. Such use permeates through every aspect of modern life—whether it be in business, academics, or simply consumer activities. Static means for delivering information such as books, magazines, newspapers and even pre-recorded video (e.g., television) lacks the real-time, interactive nature that today's consumers have come to expect. Instead, real-time, interactive, digital content is considered customary and, in many cases, the necessary format in which to deliver information.

Moreover, many content providers, mobile carriers, social network platforms, and Internet portals from New York Times and Slate to Google, Yahoo!, Facebook, LinkedIn, MSN, and AOL recognize, and in fact rely on, the addition of third-party content into their pages to increase user engagement, which leads to increased advertising revenue. An entire industry has evolved that manages this process, including advertising networks, auction sites, social sharing add-ons and tracking platforms. The conventional approach used by the content providers, the advertisers and the advertising networks alike uses specific, pre-defined "slots" (often referred to as "real estate" or "inventory") into which additional content can be added as the content is rendered. It is the job of the advertising network to determine which ad to insert into which slot based on any number of parameters. Similarly, social sites and other portals are constantly challenged with trying to determine which supplemental content to include on web pages and within mobile apps to maintain user engagement. Unfortunately, the ads and supplemental content is often of no interest to the user. As such the return on the advertising spend is far from optimal, and users have become accustomed to ignoring this additional content.

In addition, the pre-defined "slot" approach also has its drawbacks. Because of the nature and format of the content, these slots must be defined as static items—e.g., having a defined position relative to specific content and/or within the content and, usually, a defined size. The placement is not related to the contextual nature of the content, but simply the physical layout of the page, and in a very unsophisticated manner at that. For example, such systems and techniques cannot dynamically insert content that is "context-aware" (e.g., relates to the nearby content) and placed in a manner that considers the actual rendering schema of the page as not to disrupt the flow of the content or detract from the visual aesthetics of the page. While some systems allow for word or term-specific content insertion, these methods require that the content author predefine the words or phrases that are "active" and effectively tell the user which items they might be interested in learning more about. It is not a user-centric approach.

In order to be most effective, content insertion should be aware of the content into which it is being placed, the context of the content, the user's recent activities and queries, and the effect the inserted content will have on the visual nature of the page, i.e., the user experience.

As such, there is a need for techniques and supporting systems that recognize and understand the nature and structure of the content being viewed and can enhance the value of that content by adding additional, highly relevant information in a manner that adds to, as opposed to distracting from, the user's overall experience.

SUMMARY OF THE INVENTION

Embodiments of the present invention are directed toward methods and supporting systems for programmatically inserting, modifying and/or deleting content ("inserted content" or "display items") into existing electronic content ("native content") such as websites, WAP-enabled domains, mobile or traditional GUI applications. The display items may take almost any form, including, but not limited to advertisements targeting the user, simple definitions, calls to action, links to additional content, multimedia content, etc. The native content into which the display items are inserted may be the screens of GUI applications or conventional web pages built and rendered using both static and dynamic content, whether structured or unstructured. The addition of the content considers various attributes of the native content into which the display content is to be placed, the user viewing the content, the device on which the content is being placed, the structure of the content, metadata related to the content and/or the content domain, the inserted content itself, as well as many other attributes that may be specific to the instance, or, in some cases, may even be random. The insertion process also uses an insertion strategy to direct how, when and in what form the inserted content is placed into the native content.

Therefore, in a first aspect of the invention, a method for dynamically placing display items for presentation within native content being displayed within a content structure on a client device includes extending the native content by creating a content display slot within the native content at which display items may be incorporated into the native content wherein the content display slot is not defined in the native content (or, in some cases, result from pre-existing scripts that define display slots) and is based at least in part on attributes of the native content structure and data returned in response to a pseudo-query, which is based on an estimated portion of the content having been encountered by a viewer of the content. Display items (which may be prerendered items or, in some cases, components thereof that are built at the client) are received at the client for incorporation into the native content by inserting the display item into the content display slot.

The attributes of the content structure may include, for example, UI components and their properties, content display attributes such as metadata, markup tags, or hyperlinks, elements of a document object model of the content and/or elements of a cascading style sheet of the content. In some embodiments, the attributes describe subject matter attributes such as text, keywords, metadata or images from the content. The subject matter attributes may also include search engine content such as a search query string entered into a search engine at the client, a URI, and/or a URL (or listing of URLs) returned from a search query. Determination and/or identification of the attributes may occur on the client device before, after or as the content into which the display items are being inserted is rendered, or, in some cases the content is rendered virtually prior to incorporating the display items, which, among other benefits, confirms that incorporation of the display items will not adversely impact display of the native content. In some cases, the attributes are collected at a remote server and sent to the client device, or used remotely to determine the display items to be inserted. In some instances, the attributes may be organized as a directed graph or according to a hierarchical structure such that child attributes inherit characteristics from parent attributes.

The display items inserted into the native content may take almost any form, but in certain implementations comprise text, images, user interface components, buttons, application objects, and/or hyperlinks. The display items may be an advertisement, definition, or other explanatory text. The display items may take on, modify, obfuscate, or incorporate attributes from the native content such as text, images and/or links. The display items are allocated to a content display slot, which may, in some cases, be located within an atomic element (e.g., the smallest structural element) of the predefined content, in the case of HTML content typically structured using a set of HTML or XML tags that may, for example, define a bulleted listing, a numeric listing, a text fragment, a heading, a user interface component, a title, a subtitle, an image, or a hyperlink, in effect creating "smaller" or "sub-atomic" content elements, thus providing greater control over placement and display of the display slots and the content placed therein. The content display slots may also (or instead) be located adjacent to an atomic element of the content. In some instances, the content display slots include a content display attribute and a content insertion instruction. The content insertion instruction may, for example, include a temporal element that describes a time (e.g., seconds after the native content is rendered, a date, a time of day, etc.) at which the slot becomes active and/or inactive.

Multiple slots may be created across a collection of content such as a page of content, multiple pages of content within a single domain, multiple pages of content viewed during a single browser session, or pages viewed or available within an application. In such cases, the content display attributes may be consistent among content display slots on the single collection of content, such that certain display items are displayed in a consistent manner (e.g., using the same font, same color, same size, at the same time, etc.).

In certain implementations, the content insertion instructions may include an activation element such that activation of the content display slot requires a user action such as an interactive screen or application action (e.g., clicking, selecting, swiping, shaking, voice activation, moving, etc.) at the client device. The content insertion instruction may also be dependent upon the user's current view of the content, and/or the client device on which the content is to be rendered to ensure the user's view of the native content is not interrupted or interfered with. For example, a content display attribute may dictate a maximum of display items per page limitation, a maximum number of active slots limit, a maximum slot per screen limitation, and/or a minimum distance between item limitation, which may be measured in pixels, or based on a path between content elements within a document object model of the content at which the display items are to be inserted. The content display attribute may also include a restriction on displaying the display item if presentation of a display item in the slot will cause a text flow disruption when the content is rendered or if it is inconsistent with the native content.

The content display attributes may also include display coordination specifications such that the display of one display item at one slot influences display attributes of another display item displayed at another slot. The coordination may occur across a single web page, across a single screen (i.e., a viewport of a page), a single session, on a screen within an application, or across screens among an application or application family.

In some cases the content display attributes are based on user preferences and/or user attributes of the user operating the client device. The user attributes may be incorporated into a request for the display items to be received at the client, thereby contributing to the selection of the display items incorporated into the display slots. The user attributes may, for example, include demographic information, historical activities of the user such as browsing history (in some cases being limited to a single, current session) and/or purchasing history.

In another aspect, the invention provides a system for implementing the methods described above. The system may be implemented using a memory for storing computer-executable instructions and one or more processors for executing the instructions.

In another aspect, the invention provides an article of manufacture having a computer-readable medium with computer-readable instructions embodied thereon for performing the methods described in the preceding paragraphs. In particular, the functionality of a method of the present invention may be embedded on a computer-readable medium, such as, but not limited to, a floppy disk, a hard disk, an optical disk, a magnetic tape, a PROM, an EPROM, CD-ROM, or DVD-ROM or downloaded from a server. The functionality of the techniques may be embedded on the computer-readable medium in any number of computer-readable instructions, or languages such as, for example, C, C++, Java, C#, Javascript, BASIC and assembly language.

Other aspects and advantages of the invention will become apparent from the following drawings, detailed description, and claims, all of which illustrate the principles of the invention, by way of example only.

BRIEF DESCRIPTION OF THE FIGURES

In the drawings, like reference characters generally refer to the same parts throughout the different views. Also, the drawings are not necessarily to scale, emphasis instead generally being placed upon illustrating the principles of the invention.

DESCRIPTION OF THE INVENTION

Figure 1:
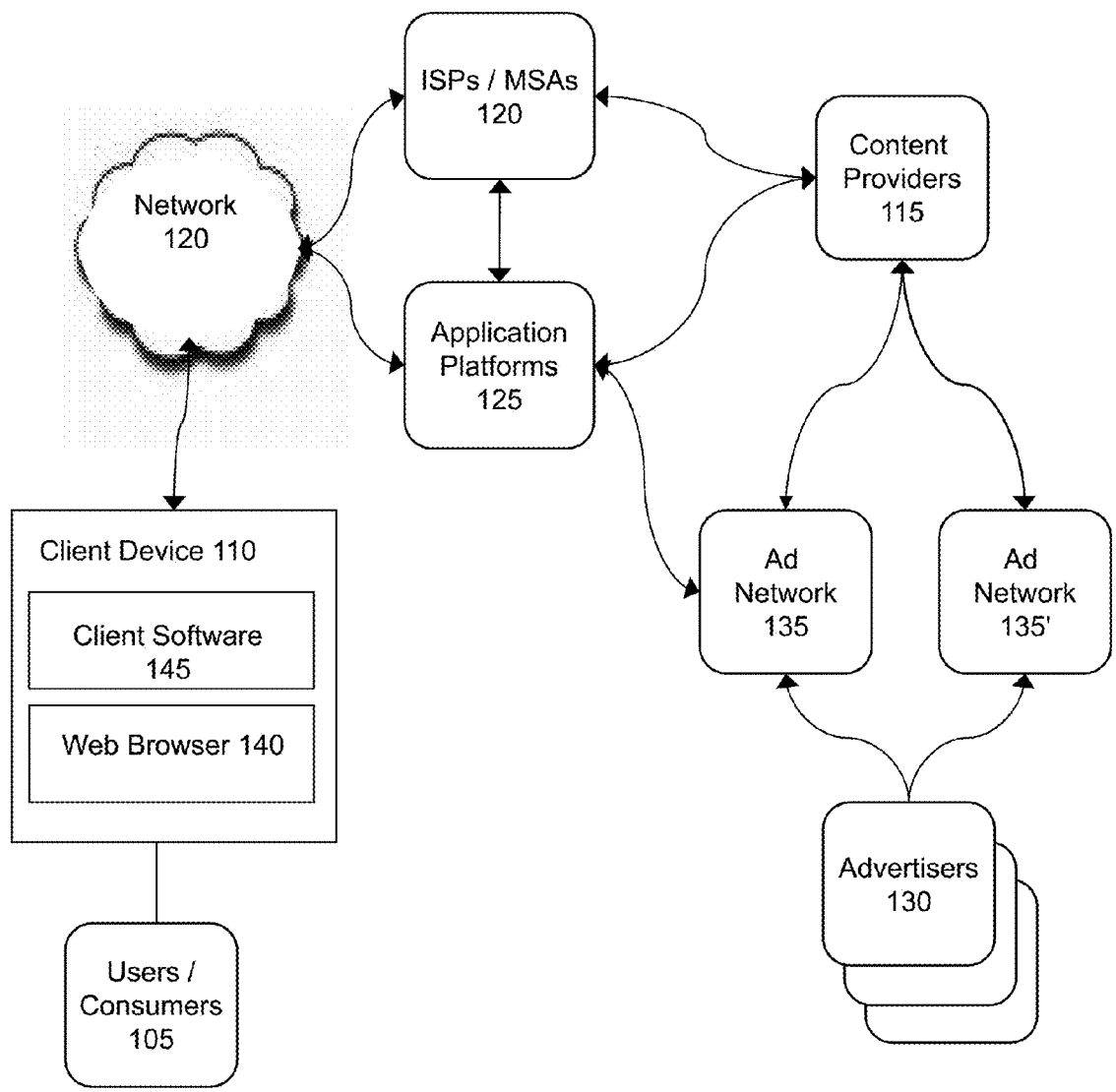
FIG. 1 illustrates the general environment in which various aspects and embodiments of the invention may be implemented and operate.

Referring to FIG. 1, various entities comprise an online content delivery environment in which users and consumers 105 (referred to herein as "users") operate various client devices 110 in order to view, download and generally interact with electronic content provided by content providers 115. The client devices 110 may be any electronic device configured to send, receive and/or display messages and content using an electronic network 120, such as a desktop computer, laptop, notebook, tablet computer, gaming console, wearable content display device, smartphone, personal data assistant or navigation system. For example, in instances in which the client device 110 is a smartphone, the device may be an iPhone, Windows, Blackberry or Android-based phone, the network may be a cellular telephone network or a wireless network. In cases in which the device is a desktop computer, the network 120 may be a wired Ethernet network connected to the Internet.

Content providers 115 manage, maintain, develop aggregate and/or collect content that will eventually be delivered to the users 105. Generally, the content is "pulled" to the user's device—that is it is delivered in response to a request from a user 105 by, for example, providing a result list in response to a search query or clicking on a HTTP hyperlink on a webpage. In other instances, the content may be "pushed" to the user by the content provider 115 based on an event (e.g., a news item matching predefined parameters) or a general email distribution. In either case, the content provider 115 typically sets aside some portion of the content as advertising space in order to "monetize" her content. Examples of ads typically seen in conjunction with content delivery include banner ads (adds at the top of or bottom of a page), "in content" ads (e.g., ads along side of or embedded within the content), linked ads (ads that appear when a user places a mouse or other pointer over a word, phrase or image) and pop-up ads.

The ads are generally created by advertisers 130, who provide the ads to ad networks 135 and 135' (generally, 135). The ad networks 135 act as "middle-men" between the advertisers 130 and the content providers 115. Such an arrangement allows advertisers 130 to create the ad and not be burdened with finding ad space in which the ad will run, and allows content providers 125 to allocate space within their content for ads without having to contract with multiple advertisers in order to fill the space. As used herein, "ad networks" 135 may refer to any online advertising-related technology system, including those used by ad networks to design and deliver their services, ad servers, demand- and supply-side advertising platforms, data management platforms, ad exchanges, and ad verification companies. While FIG. 1 is illustrated using one content provider 125, two ad networks 135 and three advertisers 130, it should be recognized that there may be any number of each entity, and in most implementations there may be thousands of content providers and advertisers and dozens of ad networks.

The users 105 typically operate the client devices 110 by interacting with software on the device 110, such as a web browser 140 that provides navigational and display functionality for content delivered to the device 110. Examples of commercially available web browser software 140 include INTERNET EXPLORER, offered by Microsoft Corporation, CHROME, offered by Google, SAFARI by Apple, Inc. and FIREFOX offered by the Mozilla Foundation. In some embodiments, the client device 110 also includes client software 145. The client software 145 provides functionality to the client 110 that allows a user to view, customize and observe the collection and use of advertising information by entities that deliver content and/or ads to their device as described in greater detail below. The client software 145 may be implemented in various forms, for example, it may be in the form of a Java or .NET applet that is downloaded to the device 110 and runs in conjunction with or as an extension to the web browser 140, or the client software 145 may be in the form of a standalone application, implemented in a multi-platform language such as Java or in native processor executable code.

Referring again to FIG. 1, the communications network 120 connects the client device 135 with the other entities in the environment. Communication among the entities may take place via any media such as standard telephone lines, a local or wide-area network (LAN or WAN links such as T1, T3, 56 kb, X.25), broadband connections (ISDN, Frame Relay, ATM), wireless links (cellular, 802.11, Bluetooth, etc.), and so on. Preferably, the network 120 facilitates the transmission of TCP/IP protocol communications and HTTP/HTTPS requests made by the web browser 140. The type of network is not a limitation, however, and any suitable network may be used. Non-limiting examples of networks that can serve as or be part of the communications network 120 include a wireless or wired Ethernet-based intranet, LAN or WAN, and/or the global communications network known as the Internet, which may accommodate many different communications media and protocols.

In many implementations, a service provider 120 provides the client device 135 with access to the network 120. Examples of service providers may include Internet Service Providers ("ISPs"), cellular service providers, cable television subscription service providers and similar multiple system operators ("MSO's"). Furthermore, application and social networking platforms 125 (e.g., iGoogle, Facebook, Yahoo!, MSN, etc.) provide users with functions such as email, file sharing, chat, and other social networking features aimed at "capturing" the users so that a majority of their activity occurs through or is facilitated by the platform 125.

Figure 2:
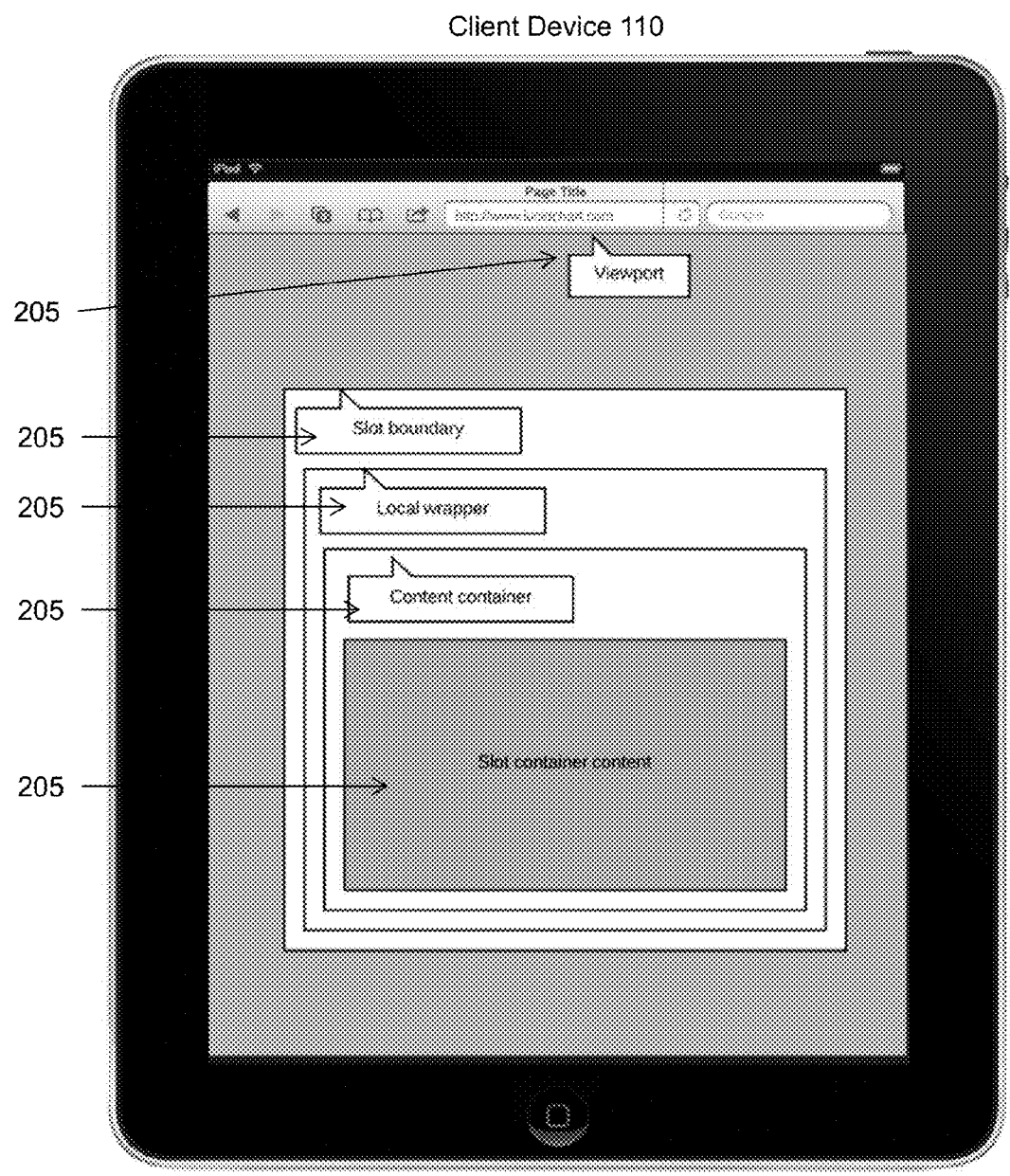
FIG. 2 illustrates the general structure of content as displayed on a client device in accordance with various embodiments of the invention.

FIG. 2 illustrates one embodiment of the client device 110 that receives, displays and request digital information to a user. The content displayed on the device may be organized according to various structures, including, for example using an object-based hierarchical structure such as a document object model (DOM) that allows the objects to be addressed and manipulated using various programming methods and application programming interfaces (APIs). In some cases, the content may also include data retrieval methods that allow data to be updated and manipulated on the client device without requiring server queries, such as asynchronous javascript, or AJAX. In other cases, the content may be stored separately from the presentation semantics that are used to define the display attributes of the content using, for example, cascading style sheets (CSS). Typically the content publisher or application owner provides additional instructions to include the functionality described below (using, for example, separate HTTP calls to a server providing the services), although in other instances someone other than the publisher or application owner may provide an integration point into the native content. This may be done, for example, using a proxy server that modifies an HTML content stream and adds the features described herein, or, for applications, a mobile app marketplace deployment process may modifies the bytecodes of a mobile application and includes an SDK in with the app itself.

When viewing the content, however, certain structural elements may be useful to define how and where content is rendered. For example, the client device 110 displays a view or viewport 205 into a particular web page or client application, which can change as the user scrolls up, down, left or right, or enlarges or decreases the screen size. In the example of FIG. 2, the client application is a Web browser operating on a tablet device, and the viewport is the effective viewable area of a particular page at any one time. Viewports may differ depending on factors such as the client device, client application and the type of display being used with the client device, such as a smartphone, a tablet computer, or a large television screen.

According to various embodiments of the invention, and as described in greater detail below, "slots" may be created within the content to dynamically display additional content items ("display items") deemed to be relevant and/or valuable. Relevance and value may be based on any number of attributes of the content, the user, the content provider, the subject matter of the content or domain, an advertiser, or, in some instances the additional content items may be randomly selected. The level of granularity may vary, such that attributes may be general (e.g., food and wine or sports) or based on specific metadata (either machine generated or user-specified such as whitelisting), keywords, images, media, links, or tags present in or somehow associated with the native content. The attributes used to define slots and the display items used to populate the slots may also be based on search data such as user-entered queries, server-generated queries, and/or query result listings.

The timing for identifying the attributes may vary depending on the context and the content publisher's design. For example, the attributes may be identified prior to or while the native content being delivered to an application or rendered in a browser. In some cases, the native content is rendered virtually (using, for example, a virtual browser) to collect the attributes in a manner that does not interfere with the display of the native content. Using virtual rendering also allows the display item to be made visible with some minimal delay based on a condition or event such as a triggering condition associated with the insertion strategy, as well as creating the impression of faster/smoother loading, and to allow any logical associated with the display item to be processed. The collection may be done on the client device at which the native content is to be displayed, or, in some cases, on a server and sent to the client for subsequent use. In certain cases, the attributes may be organized in a manner that facilitates inheritance (e.g., hierarchically) among the attributes such that attributes may inherit characteristics of other attributes.

The slots act as an extension mechanism for embellishment and extension of the native content, into which extension items (also referred to as display items) are inserted using extension logic. Display items with different content may be of the same logical type, e.g., a standard 728×90 pixel leaderboard ad matching the guidelines of the Universal Ad Package (UAP) of the Internet Advertising Bureau (IAB), a social sharing widget, links to related content, etc. Embodiments of the invention determine the number of slots that may be created, the number of slots to actually create, what types of display items to place in the slots, where the slots are located (e.g., to which user interface element(s) they are anchored, if any), the parameters and/or attributes that determine the relevance of display items to a slot and, in some cases, the native content, which display elements are included in the slots, which slots to leave empty, and any functional aspects that affect the instantiation of the display elements within the slots. All of these factors and decisions may be made globally for the entire set of native content (page, application screen, domain, session) using an optimization process that considers user experience, advertising spend and revenue, and previously displayed items, among others. The inclusion of these processes does not exclude the use of other content extension mechanisms that do not involve creating slots.

The display items may be any form of content, such as text, images, objects, media and may provide calls to action (e.g., "See what's new!"), informational (e.g., definitions), educational, advertisements, etc.

Still referring to FIG. 2, the slots may have various other structural attributes that permit the display items to be formatted and structured in a manner that does not interrupt or otherwise distract from the native content. For example, slots may have a slot boundary 210 that identifies outer boundaries of the slot. More than one slot may share the same boundary. The boundaries may be defined by the content provider or application publisher, for example, to ensure that the display items be limited to certain areas of the viewport and/or content displayed in the viewport. The boundaries may be defined relative to elements of the native content. For example, in the case of HTML content, this may be achieved by applying one or more CSS classes, special DOM element IDs, data-attributes or other mechanisms for associating metadata with or identifying one or more DOM nodes, which includes metadata stored in external systems and identification that results from executing code. The boundaries may define a range of locations within the native content such that the display items are actually smaller than the boundaries provided by the publisher.

A slot may have a local content wrapper 215 that acts as an aid in positioning, placement and styling of the display element being placed into the slot relative to the surrounding content. Display items generated by those other than the content publishers are typically limited to a small number of variations (e.g., size, shape), and thus cannot address issues such as precise positioning relative to the native content because of the potentially infinite layout and styling variability of the native content. It is typically the responsibility of a publisher or application owner to manually manage the precise placement of display items in the native content by modifying the layout of the content to account for later-identified display items. In embodiments of this invention, dynamically injected local content wrappers that are part neither of the native content nor of a display item automatically facilitate the display item's positioning, placement and/or styling within the native content based on certain objectives by transforming (e.g., add, delete, modify) the user interface elements of the native content, the display item itself, and its container (defined below). For example, in the context of HTML content, a local content wrapper may be a <DIV> or <P> element that matches the style of a group of <DIV> or <P> elements in a section of the native content where the display item will be inserted, thus ensuring consistent look and feel. In the context of a mobile iOS application, the local content wrapper may position a small display item's (such as an icon) UIView within a larger UIView whose boundary encompasses the slot's boundary.

As such, slots, and the display items placed in the slots may be placed within or adjacent to an atomic element of the native content (e.g., the most granularly defined object such as text within an HTLM document). The slots may also include a temporal element, such that the slots are active at a certain time (e.g., 10 seconds after display) and/or become inactive after some time. Activation of the slots (and/or the display items within the slots) may be triggered by a user action such as clicking an application object or hyperlink, a selection from a drop-down list, a mouseover, or other screen action.

A slot may also include a content container 220 that defines the physical boundaries of the display item content 225, and may provide functional services such as, but not limited to, lifecycle management, access to client capabilities, rendering, data and services access, communications and networking, state management, persistence, caching, conversion tracking, analytics, logging, debugging, and/or security and isolation of the display item relative to the surrounding native content. These services may be provided by the container 220 or other system-level settings, in which case the container 220 may facilitate access to the services. Content containers 220 may also facilitate the communication and exchange of data, including access to shared data structures, among display items placed into different slots. The container services may be consumed explicitly, such as a display item exchanging data with a related display item for the purpose of user experience coordination, or implicitly, such as registering event handlers that monitor user actions for reporting and analytics or rewriting resource identifiers such as URLs for caching or conversion tracking purposes. In the context of HTML content, the following are examples of containers and the type(s) of services they provide to the display content:

A <DIV> element with fixed height and width and hidden overflow, thus protecting the surrounding native content from unexpected variations in display item size.

An iframe with fixed height and width having a src attribute that loads the display item, which, in addition to enforcing size limits, provides an isolated JavaScript execution environment for the display item.

An iframe with fixed height and width whose contents consist of the display item and JavaScript that ensures services such as click tracking and user settings management are available to the display item.

In some instances, the internal boundary of a slot lies between the wrapper 215 and the container 220. The wrapper 215 and the container 220 may be physically represented by the same elements/structures on the client. For example, an <IFRAME> tag with specific size and specific whitespace margins and padding may be used as a wrapper by controlling the size and positioning of the slot and as a container by providing an isolated namespace and DOM. In a more traditional GUI or native mobile application, for example, the role of a wrapper may be served by a canvas-type UI component, and placement is implemented using layout engines and/or UI component parameterization, and container services are provided via decorator/interceptor patterns.

In certain embodiments, slots may be defined and/or placed based on the identification of natural breaks in content (e.g., white space, break tags, distance within a DOM tree, etc.), relationships between and among the content elements (list items within paragraphs within articles, etc.) and how the user consumes the content.

Being able to place ad units into dynamically created slots with this type of precision, also facilitates context-aware targeting within a page—while still using page-level optimization methods as to take advantage of where most metadata is generated and stored. To maximize performance, the system's targeting and optimization algorithms are aware of all placement opportunities within a page. In the case of search advertising in content, pseudo-queries are generated from different content locations taking into account both the hierarchical nature of content and the mechanics of how humans process content. For example, at the halfway point in an article, a person reading the content on a page typically has context about the content from the beginning to that point but not about the content from that point to the end. Therefore, a pseudo-query used to generate an ad unit for a dynamic slot placed halfway down the content is based primarily (or in some cases exclusively) on the content that precedes the halfway point to avoid ads based on content the user has not yet seen or read.

Other metadata may also be introduced into the pseudo-query in order to optimize the effectiveness of both the dynamic placement of the slot and the content item placed in the slot. In contrast to ads placed on search engine results page, which are based on the primary search query and a separate algorithm for selecting ads (e.g., AdWords), or strictly page-level programs that look at the contents of an entire page and attempt to optimize ad select at the individual slot level (e.g., AdSense), embodiments of the invention consider how the content on a page (or application screen) is actually being consumed, and builds pseudo-queries based on this real-time data.

As a result, the system increases the likelihood of users clicking through or otherwise interacting with an advertisement. More specifically, the system considers mental momentum targeting by maximizing the intersection of mental momentum (what the user has seen and consumed) and the ad context. The placement engine can also create dynamic slots at key content locations with narrow expected distributions of mental momentum—that is at specific locations within the context where there are strong signals regarding the user's intention and recently viewed content. With respect to ad selection, a page-level optimization methodology is used in contrast to the conventional per-slot ad optimization typically used in display advertising, or the top N optimization listing techniques used on a search engine results page, where the ads target the same user query that generated the page. Maximizing the combined likelihood of a user finding at least one ad worth clicking requires page-level placement optimization across all possible dynamic slots, which may have substantially different ad targeting requests.

The placement engine can also create dynamic slots at key content locations with narrow expected distributions of mental momentum or low mental momentum entropy—that is at specific locations within the context where there are strong signals regarding the separation between a user's general set of interest and intent, whether known or unknown, and the concepts currently activated in the user's mind based on recently viewed content, where recent may mean shorter than one second in some cases.

With respect to ad selection, a page-level optimization methodology may be used in contrast to the conventional per-slot ad optimization typically used in display advertising, or the top N optimization listing techniques used on a search engine results page, where the ads target the same user query that generated the page. In the general case, maximizing the combined likelihood of a user finding at least one ad worth clicking (or other inserted content worth engaging with) requires page-level placement optimization across all possible dynamic slots, which may have substantially different ad targeting requests.

The notion of global page-level optimization extends to content that may be authored, curated, stored, edited and rendered (collectively, "delivered") using techniques and systems beyond conventional content management applications typically used by content providers and publishers. Though it may be delivered to the page/screen using a system entirely separate from the system described herein, these techniques can nonetheless indirectly control the content because of their ability to insert dynamic slots, as well as modify or transform the data structures that define the user's experience over time, including prior to the point at which decision are made to generate, render or otherwise deliver certain user experience elements.

For example, a Web page may have a certain element defined as part of its layout and content flow for a certain type of page. Using the methods described herein, the element may be replaced with another element some portion of the time, removed altogether, or modified (by altering the data structures related to presentation, for example). As a result, the element may never come into existence—and this change may be based on some logic, typically driven by experimentation and/or optimization objectives using unique signals and/or balancing the unique requirements, desires and objectives of multiple stakeholders, such as publishers or application developers, end users, advertisers and their representatives and the owners/operators of the systems described herein.

According to various embodiments of the invention, the logic responsible for creating the specific forms of the local content wrapper and content container for a given slot as well as enabling a display item's placement in the container is referred to as the insertion strategy associated with the slot. In some embodiments, the functionality is extended to the native content recursively such that extension content at one level becomes native content at the next level.

The insertion instructions may be coordinated and optimized across the native content, which includes coordination among multiple web pages, viewports of web pages, application screens, domains, devices and/or sessions. In doing so, the slots that display content may be positioned and presented consistently and in a manner that is visually appealing to the user and that attempts to model the thought process of the user as they scan the content.

Often publishers do not provide an explicit definition for where extension content may be added to the native content, but instead allow for an implicit definition. For example, a publisher may know that ad units from Vendor X will be 500×300 (in pixels) because this is (a) the historical behavior of the Vendor X script that the publisher gives control to via a <script> tag and (b) this is what Vendor X indicates on their site is the expected behavior of the particular script parameterization used by the publisher. In other instances the publisher knows that the inserted display item may take up all of the available horizontal width space but will be limited to no more than four lines of text vertically. In the cases where the size of display items is not fixed, the expectations around it are relatively tight based on the display item types.

In conventional content placement techniques, a slot has a fixed position relative to the high-level structure (layout) of the content and/or the viewport/screen, e.g., it is after the title, at the end of a blog post, the third listing on the right side bar or a catfish ad at the bottom of the screen. Because different elements of the native content may change the low-level structure (for example, the DOM of HTML content) a slot may end up in a different absolute (pixel) location but logically it is in the same place and a publisher or application developer knows what that place is.

In conventional content placement techniques, the total number of slots associated with a logical unit of native content varies only by the type of content the user sees and its layout as opposed to being based on the specific content a user would see in a client device at any one time. Conventional approaches tie extension content directly to native content such that they exist in a structurally static relation to each other, e.g., with respect to layout.

In some cases, the logical unit of native content may be smaller than a page as in the case of Web sites or a screen in the case of GUI applications. One approach is to aggregate the native content into a collection of logical native content units with a repeated layout. As an example, a home page of a blog site may show more than one blog post in full or short form. While the total number of slots may vary based on the number of posts on the home page, the relationship of slots to posts and the types of display items that may be shown in these slots does not change.

Embodiments of the invention described herein break this dependency such that the relation between native and extension content is dynamically driven not just by the type of native content but by also by the native content itself, as well as additional factors such as user attributes. This applies both to the placement of slots (and, by extension, the display items placed in the slots) as well as the number of slots that are assigned extension content.

The term "slot" is used as an abstraction for discussion purposes. In some cases, the slot may be defined using logic internal or external to the native content. For example, in the case of Web pages, a <script> inside the <head> of a page may cause the display of a social sharing widget after the first level 1 heading (<H1>) element, which often is the title, even though there is no static physical slot identified on the page for this code to render display items as the native content. In effect, according to conventional practice, the slot is created using extension logic (server code, a client script, an ad network SDK in a mobile app, etc.) that extends the content of a Web site or application and uses a static insertion strategy relative to the native content. This results in the display item(s) being inserted at a structurally static/consistent location, which is referred to herein as a "slot."

In conventional practice, display items inserted into slots may be static or dynamic. While the display items may be dynamic, the type of the items is known. For example, conventional sharing or advertising slots show what they are pre-configured to show based on the constraints of the publisher-provided parameterization, e.g., some combination of social sharing and/or trending or related content.

In conventional practice, slots are "actualized," meaning extension(s) receive request(s) and the expected outcome of the request(s) is for extension logic to cause display item(s) to be shown in the slot(s). The requests may take many forms depending on the client environment and other factors. For example, in the case of HTML content, a request may be a resource load via an HTML element (e.g., a <script>, <img> or <iframe>) or a JavaScript call to a JavaScript object that is available on the page.

In summary, conventional content extension techniques, such as ad insertion, rely on an early binding between (a) the types of extensions that will extend the content, and (b) the relationship between extensions and slots, typically on a per slot basis. As a result, the number and placements of slots is static relative to the layout of the content and slots are expected to have extension content. Moreover, the conventional insertion systems expect that the content will be seen in a static slot at a known location on the page or in the application, or, in the case of dynamic slots will always be filled with content but at an unknown place on the page or application screen.

In contrast, various embodiments of the invention provide optimized late binding by determining dynamically, and in a coordinated manner, (a) which display items are run, (b) where they are to be placed relative to the content at both a page level and within content elements, (c) how they are parameterized and (d) which slots they target. This allows for late binding in two respects. First, a dynamic determination of which slots are instantiated and the triggering conditions and parameters that define the slots. Second, a dynamic decision is made external to an extension about when/whether a request to an extension is to be made and whether the extension logic can render the display items being tied to the slot, or, if it has already rendered the display items, when and/or whether the content will be made visible to the user. This is done via a dynamic coordination layer that optimizes based on a number of factors such as user experience, revenue potential, and operational costs such as computation, bandwidth, etc. For example, the system may request an extension to render a display item in a manner invisible to the user in order to determine the exact dimensions of extension content, and as a result may determine that the rendered content should not be inserted at that time because it would negatively affect user experience.

The extension logic used to determine where and when the display items are placed may be related to the extension content itself across native content at various levels of granularity, e.g., in the case of HTML content on the Web, a page or session or unit of time. As such, there is system-level extension and display content coordination (on the server and/or client-side) with regards to what gets placed where that is independent of the extension logic in any one extension payload (a widget, ad, etc.) across all types of extensions and display content within the influence of embodiments of the invention. This functionality provides the ability to mediate among display items and, potentially, native content competing for the same screen real estate, and enables an optimization/arbitrage/auction model for content extension that is fundamentally more capable than existing mediation and exchange approaches because of the additional flexibility provided by the late binding and coordinated placement optimization.

In some instances, an optimization approach considers the entirety of content being presented on a particular page (or, for native mobile applications, an application screen) and can rewrite, reorganize, or otherwise redistribute the content to account for the dynamic insertion of the display items.

Benefits of the late binding of the extensions to the native content and the display items that are displayed in the slots include:
  The ability to separately manage and dynamically impact the number and location of slots where display items may be added to the native content using constraints governing how much or many of the display item(s) should be displayed, i.e., which slots become actualized, maximum slots per page, screen or viewport, etc.
  The ability to dynamically vary the number of slots for display items based on not just the type of native content (layout) but the native content itself
  The ability to dynamically choose which types of display items are displayed in which slot.
  The ability to dynamically determine not just when some slots' extension logic should be activated but also when display items already generated by the extension logic should or should not be presented to users.
  The ability to dynamically manage the insertion of display items of substantially varying size into the same slot.
  The ability to dynamically group the insertion of more than one instance of display items into the same slot.
  The ability to dynamically manage the distance(s) or density between slots such that a customizable constraint, such as minimum and/or maximum distance (in pixels, page elements, paths between content elements within a DOM, lines, etc.) or density (number of slots and/or amount of real estate occupied by slots per unit of viewport area (square inches, pixels, etc.), may be enforced.
  The ability to consider the user interface rules (both explicit and implied) to determine whether placement of a display item may cause an error with regard to how the content fits within the structure of the page or application screen.

In some implementations, display items may be aggregations of other display items, such aggregations generated by extension logic controlled by the invention or not. This mechanism allows for multiple display items to be displayed in a single slot, if necessary.

Figure 3:
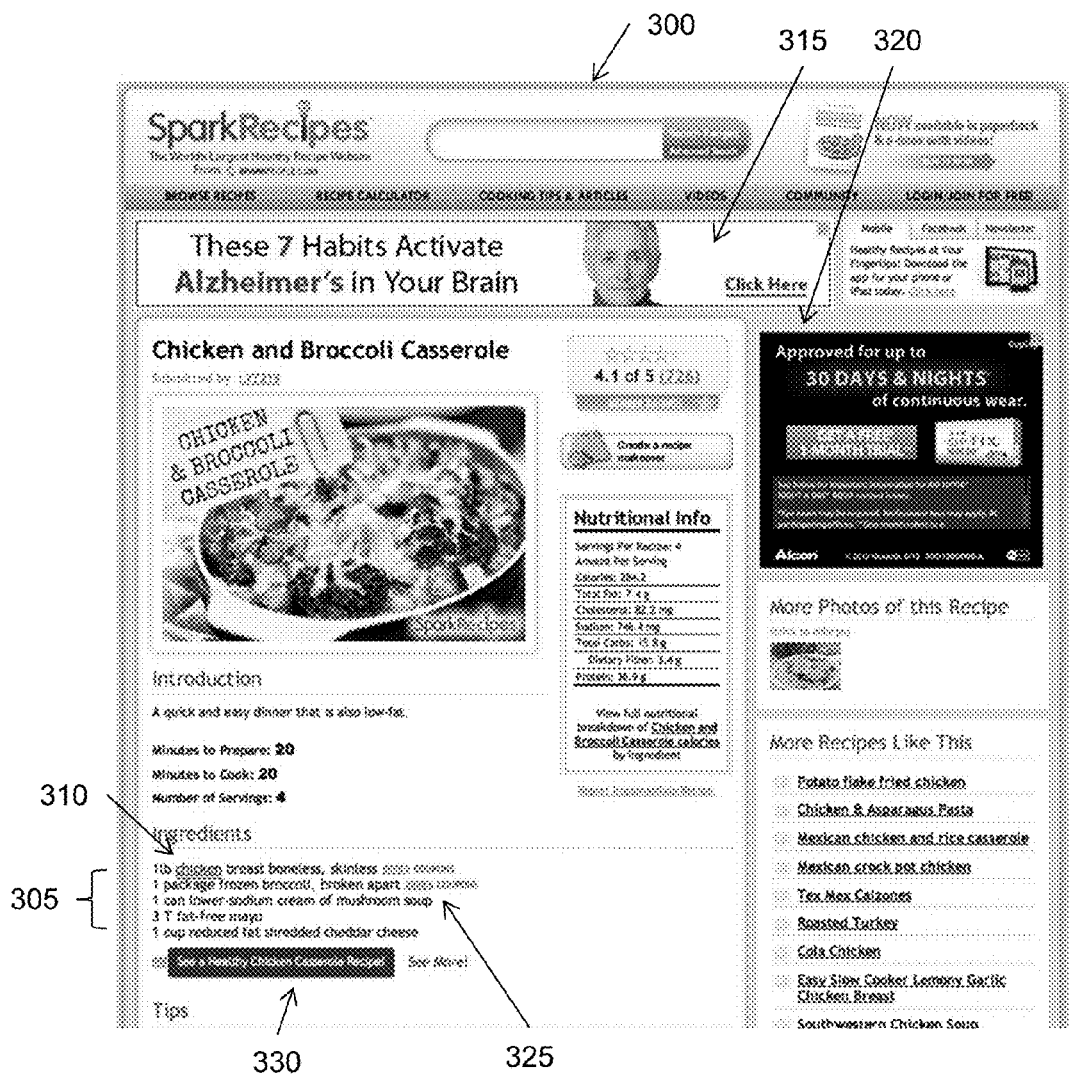
FIG. 3 is a screen capture of a web page on which various embodiments of the invention may be implemented.

FIG. 3 is one example of a web page 300 having multiple sources of content and enhanced with the dynamic placement of display elements according to the techniques described herein. The overall styling, layout and functionality are determined by the publisher. The parameters for the styling are represented as HTML, CSS, and/or JavaScript and delivered to the browser having been organized in a particular way by a publishing system, which, in the case of the web page 300, is based on Microsoft's Active Server Pages.

The recipe content 305 is user-submitted content, in this case submitted by user LYZ219 via the publishing system and is stored in a data store such as a SQL-based database and is generated and/or inserted as HTML into the core layout of the page. Therefore, although the content for the recipe was submitted be a third party user, the publisher controls both the content, the mechanism by which the content was converted into a renderable form and the mechanism by which this renderable form was delivered to the client. As such, the insertion of the content is not considered a slot, as it is not an extension of the native content, but the content itself placed into a pre-defined position on the page relative to the static page definition.

The double underline 310 under the word "chicken" is implemented using conventional techniques by adding a <SCRIPT> tag to identify that blue link color should be used, adding a script tag to load an in-line advertising module from the ad source and wrapping the recipe content with a <DIV> tag identifying it as targetable by the ad source, otherwise the ad source could target all the text in the page, which is undesirable from a user experience standpoint. An example of the code to implement this is shown below:

```
<html>
    ...
    <body>
        ...
        <div class="AdBody">
            <h1 itemprop="name">Chicken and Broccoli
            Casserole</h1>
            ...
```

```
        </div><!-- End AdBody -->
        ...
        <!-- AdSource ContentLink(TM);-->
        <script type='text/javascript'>
            var dc_AdLinkColor = 'blue' ;
            var dc_PublisherID = 162727 ;
        </script>
        <script type='text/javascript'
  src='http://ad.adsource.com/javascript/lib/AdLibInline.js'>
        </script>
        <!-- End AdSource -->
        ...
    </body>
</html>
```

In this implementation, the publishing system controls the type of content the third party ad service can render (inline links), its style (blue), and where the content can be placed (in the recipe title, ingredients, directions, etc. but not in comment or the sidebar). In some cases the ad service can wrap some of the content in an anchor tag based on the style specified by the publishing system. But in each case, there is no new content displayed to users as the change is purely presentational.

The Altzheimer and Alcon advertisements 315 and 320 are delivered by the Google Display Network. The process also begins with a call to an ad network. In this case, the publishing system also controls the container in which the ad will appear (an iframe), the size (728×90, a standard IAB leaderboard unit) and the styling and positioning via CSS classes. Again, the placement and positioning of the ads is not dynamic.

In contrast, the two orange icons 325 to the right of the chicken and broccoli ingredients and the red button 330 after the ingredients section are delivered using various embodiments of the invention described herein. The implementation is effectuated using a <SCRIPT> tag but no other parameters need be defined by the publishing system, as it does not control where the slots are to be placed, the display elements that are displayed in the slots, how the content is to be contained, or what the styling parameters should be. Instead, using the orange icon with the text COUPONS to the right of the first ingredient as an example, the wrapper and container are represented by a single <DIV> tag which provides for four pixels of left margin and inline placement and containment via bootstrapCtrl, which, in this particular example, is an Angular.js component. It should further be noted that the fact that both dynamic ingredient slots show information about coupons was not predetermined but is instead the result of dynamic optimization whereby an attempt to present optimal choices for display items is made. Typical embodiments of the invention running on recipe pages would allow several different types of display items to be inserted near ingredients. An example of the script code is shown below:

```
    <!-- +SWOOP -->
    <script type="text/javascript" id="spxw_script"
    src="http://ardrone.swoop.com/js/spxw.js"
    data-domain="SW-36912244-1"
    data-serverbase="http://ardrone.swoop.com/"></script>
    <!-- -SWOOP -->
    span itemprop="name" class="spx_inspected spx_global">
        1lb chicken breast boneless, skinless
        <div style="margin-left: 4px; display: inline-block; visibility:
            visible;"
    class="spx_wrapper ng-scope" id="spx_reset_2">
```

```
    ng-controller="bootstrapCtrl">
        ...
    </div>
</span>
```

In conventional practice, when users engage with extension content, e.g., ads or related/trending content units, they are often taken to a third party site. This detracts from the user experience because the quality, look and feel of the third party sites varies considerably. Further, extension content is often used as a vector for phishing attacks or for delivering malware to client devices. In addition, conventional approaches cannot optimize content delivery based on how users behave on those third party sites because of the hurdles to instrumenting the sites for tracking basic conversion metrics, let alone advanced metrics such as bounce rates or mean/median visit time. For example, while many advertising systems may track conversion events, most cannot track engagement times. This is because a third party such as an advertiser that wants to engage users with some content has no easy way to show this content to users anywhere else but on a site they (or parties acting on their behalf) control, where they can use traditional publisher-centric analytics systems such as Google Analytics or Omniture.

Figure 4:
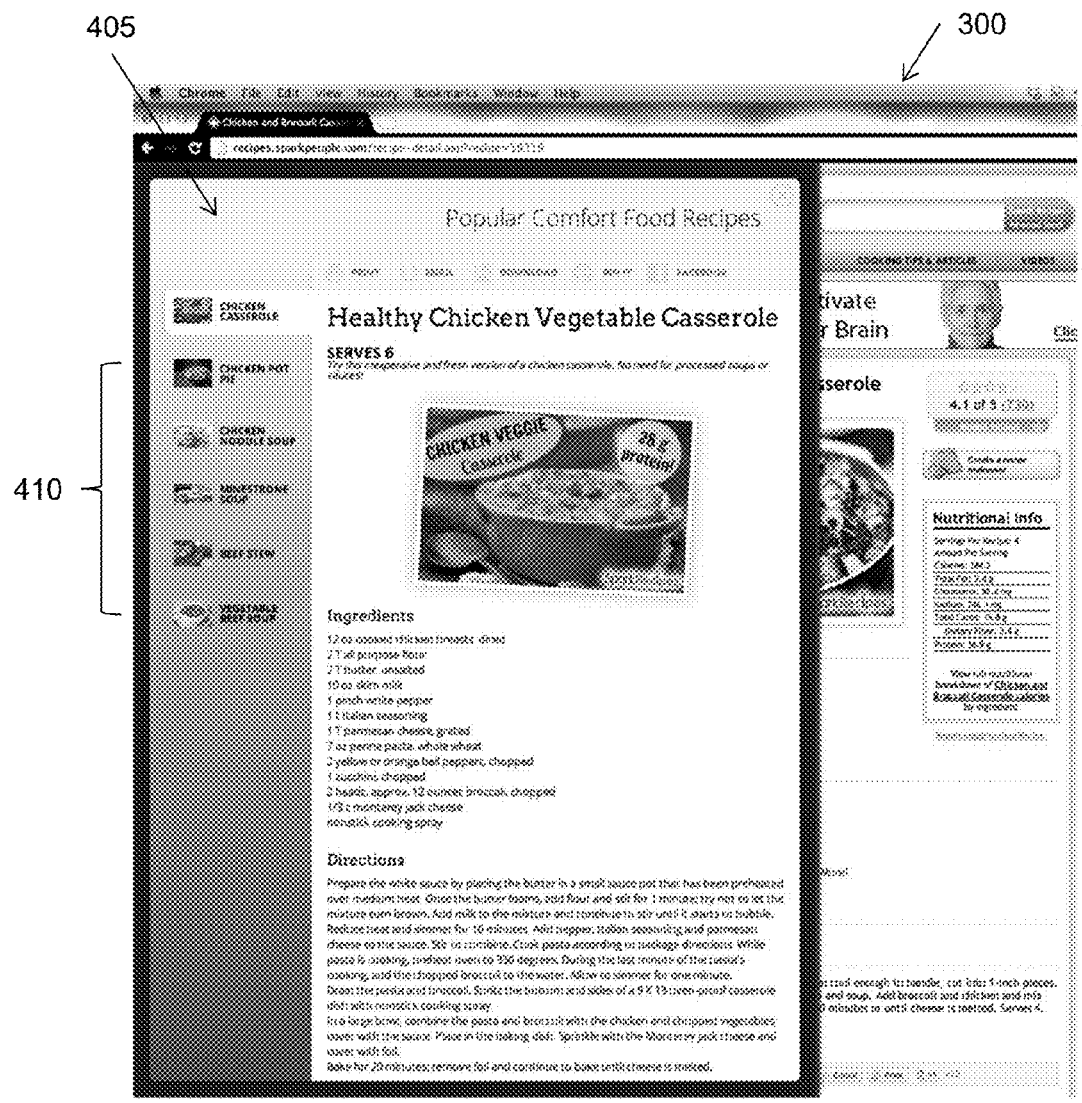
FIG. 4 is an extended screen capture of a web page and additional display content being presented the user according to various embodiments of the invention.

Certain embodiments of the invention address this problem by allowing rich and potentially interactive content to be displayed within the context of the client application without necessarily changing the viewport. Referring to FIG. 4, an example screen shot displays the engagement unit 405 presented to a user who clicked on the "See a Healthy Chicken Casserole Recipe!" button 330 from FIG. 3. In this case, the display item representing the button was associated with a target. Clicking on the button activated the target, which, in this case, caused the display of a recipe for Healthy Chicken Vegetable Casserole in a particular "engagement unit" 405 that slid out from the left side of the screen. The engagement unit 405 is an example of the types of advanced user experiences that are possible using the techniques described herein. One benefit to users is that they can see the content described in the button call to action (a healthy chicken casserole recipe) immediately, without having to wait for a separate page to load. Over time and across different sites and applications users can recognize the various engagement units presented by the system. This familiarity can result in, amongst other things, deeper engagement and greater user satisfaction, which benefits all stakeholders. Publishers and application owners get the benefit of longer user sessions and the potential for additional revenue. Advertisers get higher ROI due to deeper user engagement and because the engagement unit's reporting and analytics capabilities create a complete, end-to-end system with a closed feedback loop. This allows for automatic optimization based on both short-term objectives such as clicks, medium term objectives such as video view completions or conversions to other actions as well as long-term objectives such as deeper user engagement on repeat visits. Further, because the entire user experience is managed, there is an opportunity to manage user settings in ways that allow users to be more efficient and/or receive more value. For example, users can provide social logins and email addresses that make sharing actions faster or they can specify the type of content they are more or less interested in engaging with, which can be used to tune the type of extension content they see in the future.

By focusing on the content that the publishers and advertisers want users to engage with as opposed to the presentation of that content, the innovation eliminates the need to create landing pages for ads, as well as enabling efficient, large-scale, programmatic creation of engagement units using template-based mini applications driven by extensions of the native content.

In some embodiments of the invention, the target is the content (in this case the healthy chicken vegetable casserole) and the determination about which presentation unit should present this content and how should the presentation unit be parameterized is made dynamically based on many factors and with the purpose of optimizing certain value functions. In other embodiments, the target may specify just the presentation (with the content determined dynamically at the point of user engagement) or a combination of presentation and content or any partial parameterization thereof.

In some embodiments of the invention, attributes of the extension content (in this example, the button 330) are dynamically generated based on attributes of the target content (in this example, the title of the healthy chicken casserole recipe). This may happen at various levels of sophistication, including, for example, dynamically generating multiple calls to action based on combination of target content attributes, native content attributes, user attributes, e.g., historical propensity to engage with different types of calls to action, and other context attributes, e.g., a search query the user used to arrive at a Web page. Attributes of the display content may also be based on (and automatically generated from) groups of target content of the same or different types. For example, a call to action for "great savings" may combine coupon offers, e-commerce offers, affiliate offers, information about what's on sale in local stores (with appropriate geo-targeting) and other deals. In another example, a call to action to see healthy chicken recipes may parameterize dynamic systems such as one or more search engines or content stores, e.g., Google search and a site's own recipe search. In some embodiments of the invention, dynamic optimization happens across the multitude of these choices multiplied by the many ways extension content and engagement units can be presented for any one user, for any native content, context and slot.

In specific use cases where the native content is represented by a search engine having certain characteristics that are specific to search, the functionality can be extended to the page or pages selected by the user that are not controlled by the search engine itself (e.g., not a sponsored ad or page for which the search engine is paid). Examples of these characteristics include, for example, page rank, display format (e.g., as a structured recipe, instructions, etc.), or display style. This allows the search engine (or content providers) to extend their advertising reach to users that used the search engine by inputting a set of queries Q but did not (a) click on an ad or (b) clicked on an ad from a third party. Essentially, the search engine is provided a second (or more) opportunity to retarget the user on best organic result pages as selected by the users over time. To implement this practice, a set of queries may be periodically executed for certain topics to determine which pages appear in the top 50 results and apply the techniques described herein against those pages by integrating with the publishers. In effect, the attributes are related to the rank (e.g., in any of the top N results for the group of queries) of the native content returned against certain search queries.

Generally, this technique extends the scope of what can be considered as attributes of native content to include not just the specific elements of the content itself, but also results of how the native content and elements within the content are treated by various processes. For example, a search engine may use portions of the native content (e.g., a title, a thumbnail image and the first user-generated comment) as content to be used as the results of a query. Likewise, an application may scan the native content and provide an outline of the content. How the native content is treated—i.e., how highly it is ranked, whether an element of the content is considered statistically significant to subsequent user views, etc. may all be used as attributes of the content itself, even though these concepts are not technically included in the raw content.

The following examples are illustrative. One set of attributes of native content on a Web page may be related to the manner in which content representations C derived from the same origins as the native content on the Web page are presented in search results R for some set of queries Q. The attributes may include information about the presence or absence of elements of C in elements of R, the position of elements of C in R, the exact or expected presentation of elements of C in elements of R, etc. For a recipe on a Web page, as an example, the recipe may exposes certain meta-data using microformats, and if the recipe ranks at a particular position within a search result list, the recipe may be represented in a manner than shows elements of the exposed meta-data such as a thumbnail image, rating, cooking time, etc. Otherwise, the recipe may be represented as a normal search result, e.g., title, brief description and link. The different ways the search result is presented to a user may affect the expectations the user has with respect to the native content, which, in turn, may affect the user's behavior upon visiting the native content as well as the user's propensity to consume other types of content. This information, derived from the attributes of the native content related to its presentation in search results may not be directly observable but may be inferable. As such it constitutes a valuable portion of native content attributes that improves both the relevance and the value of displayed items.

In another example related to how content representations C derived from the same origins as the native content on a Web page are presented in search results R for some set of queries Q, the information about the position of C in search results R for elements of Q may be used to infer the likelihood of a user visit to the Web page having originated from a search result page for a query from Q, even though the particular query may not be provided as part of the request for the Web page. This calculation may involve additional information such as the set of observable origin queries associated with requests to the Web page.

Unlike conventional approaches, this type of information may be used as attributes of the native content, regardless of its derivation including but not limited to by first, second or third parties, on the client and/or server, online and/or offline, once or in some manner of repetition, precisely or in a manner involving probabilistic or other types of uncertainty.

In some embodiments of the invention, attributes of the engagement unit content may be generated by recursive application of the extension mechanisms enabled by the invention. Referring again to FIG. 4, the user is presented with a chicken casserole recipe in the engagement unit 405 because this is what the call to action in the extension content referenced. However, the five other recipes 410 shown in FIG. 4 could have been selected as extension content for the native content of the engagement unit (consisting of the healthy chicken casserole recipe). With the knowledge that the healthy chicken casserole recipe would constitute the native content of the engagement unit, the selection of the extension content and its mode of presentation may have occurred before, simultaneously with or after the presentation of the native content. This knowledge can be used to drive advanced optimization such as pre-computing and caching content extension decisions, prefetching and caching content, etc.

In some embodiments of the invention, the act of triggering the engagement unit 405 is analogous to an API call within the system with parameters such as the target content and the UI component representing the engagement unit 405. This API abstraction is at odds with the traditional mechanism for activating resources on the Web, which is some type of link represented by a URL or, more generically, by a Uniform Resource Identifier (URI). This applies in many cases to non-browser applications being initiated by a link such as an email client using a "mailto:" link. Moreover, the engagement units are kicked off from extension content initiated by the selection of a display item, which is not part of the native content and which, at least in the case of Web pages, lives in a page with a pre-determined URL. In conventional practice, this prohibits a user from looking at the healthy chicken and vegetable casserole recipe in the engagement unit, which was kicked off from the chicken and broccoli casserole recipe at URL http://recipes.sparkpeople-.com/recipe-detalasp?recipe=59319, and sharing a link with her Twitter followers that, when clicked, would allow another user to see the same user experience, i.e., the healthy chicken and vegetable casserole recipe presented in the context of the chicken and broccoli recipe. Instead, a conventional approach would require navigation to a page where the healthy chicken and vegetable casserole recipe is shown, which may not exist or may not be controlled by the same publisher.

To address these issues, embodiments of the invention introduce a new mechanism for linking to content and the logic used to implement its presentation. The logical model for the linking is a Web services call structured as Uniform Resource Identifiers (URIs) that encode the API call into URI form. For example, on the recipe page of FIG. 3, the specific link for showing the recipe engagement unit may be structured as:

swoop:/campaign/respLoad?campid=spx-2013-q1-2&placement=left&frame=responsive

It identifies a target (campaign/respLoad) with three parameters: campid=spx-2013-q1-2, placement=left and frame=to responsive. The requests for display items are intercepted and the URI affects the intended behavior of the call. Further, the links may be encoded into existing URLs (or other URIs). For example, a link may be used as the anchor of a URL, including preserving the behavior of an existing anchor, if present. If a user clicks on the URL containing an encoded link, the user may experience the following: (1) a browser navigates to the native content page and (2) as soon as possible the logic targeted by the link activates and presents the appropriate display elements as additional, extended content. This functionality allows users to share the exact experience they are seeing, allows publishers who originate link sharing or bookmarking or other saving actions to receive the traffic when those links are used, and facilitates linking to content that, without the additional links, could not be linked to because it is not URL addressable.

Embodiments of the aforementioned link mechanism support many of the behaviors provided to URLs by the HTTP protocol such as authentication and security, redirection and error reporting. In addition, they can provide benefits typically associated with Web services that are not part of traditional HTTP protocol handling of URLs such as reporting and analytics and sophisticated error handling in the case of unavailable or deleted content. Moreover, this linking structure and mechanism may be extended to non-browser applications that can be kicked off via URIs that include functionality provided by embodiments of the invention. In summary, the link mechanism described herein presents a unique and general mechanism and platform service for addressing logic and resources currently not addressable by current content insertion practices.

The insertion logic and display items may also be based on attributes related to content previously seen by a user in combination with actions take (or not taken) with that content. For example, the checkout processes on ecommerce sites or within an application or app marketplaces often include content that is related to selection of payment methods (AMEX, VISA, MasterCard, PayPal, etc.), and inclusion of addition items (insurance, expedited shipping, express boarding, etc.). Using the techniques described herein, the native content may be extended to include messages about missing out on certain opportunities ("Get double points and free checked bags if you use your AMEX card!") and calls to action to address these opportunities.

In many implementations, the behavior of the system is driven by attributes of the native content. In current practice, when content attributes are needed by a system, the content is usually crawled or accessed via a mechanism such as an RSS/Atom feed, an API, or data dumps. This practice has a number of limitations, including but not limited to: (a) a lag between the time content changes and the time a system needing to respond to the content change is notified of the change, (b) difficulty with accessing and processing highly dynamic content (with highly parameterized URLs such as a search results page on a recipe site whose contents change with the search parameters and the recipes, (c) difficulty accessing secure content that requires login or authentication credentials, (d) difficulty responding to content where the same URL may present very different content to different users, (e) difficulty identifying and processing dynamic content generated by JavaScript, and (f) difficulty identifying and accessing non-Web content such as mobile application content. Furthermore, even if the native content could be accessed, current practices typically operate on an incomplete representation of the content. For example, in the case of HTML content, most crawling-based approaches do not analyze the crawled content in the context of a true browser engine, supporting full CSS, JavaScript and other extensions while considering cookies and realistic user history. In the context of highly dynamic and personalized Web experiences, this means that current practices often operate on old, partial, low-fidelity representations of the content users see and, in many cases, make poor judgments about what the content is and what relevant extensions should be added to the content. For example, without server-side JavaScript processing, there is no way to see any JavaScript-related changes to the content. Server-side JavaScript processing (usually in a headless browser), however, is very expensive operationally. In another example, consider the case of not running a CSS engine when analyzing content. Section A of HTML content could appear very far from Section B in the HTML DOM tree, however when CSS rules are applied Section A is floated immediately next to Section B. This visual and potentially logical relation between Section A and Section B can only be noticed if content analysis involves executing the equivalent of a CSS layout engine. In yet another example, it may not be possible to determine whether a portion of HTML content will be visible on a given device with a given viewport size. Not knowing a priori whether an ad slot will or will not be visible has significant implications on optimizing advertising decisions such as how much to bid on an exchange for the opportunity to display an ad in the slot.

To address facilitate the real-time, dynamic identification of slots into which relevant display items may be placed, various embodiments of the invention may perform content extraction and analysis on the client, in the context of the full runtime environment as well as across users, devices, etc. In doing so, the challenges described above are addressed in that both static and dynamic content (both native and extension) is visible to the extent allowed. Further, because executing logic on the client uses the client's resources, there are substantial cost advantages to doing at least some content extraction and analysis on the client.

Figure 5:
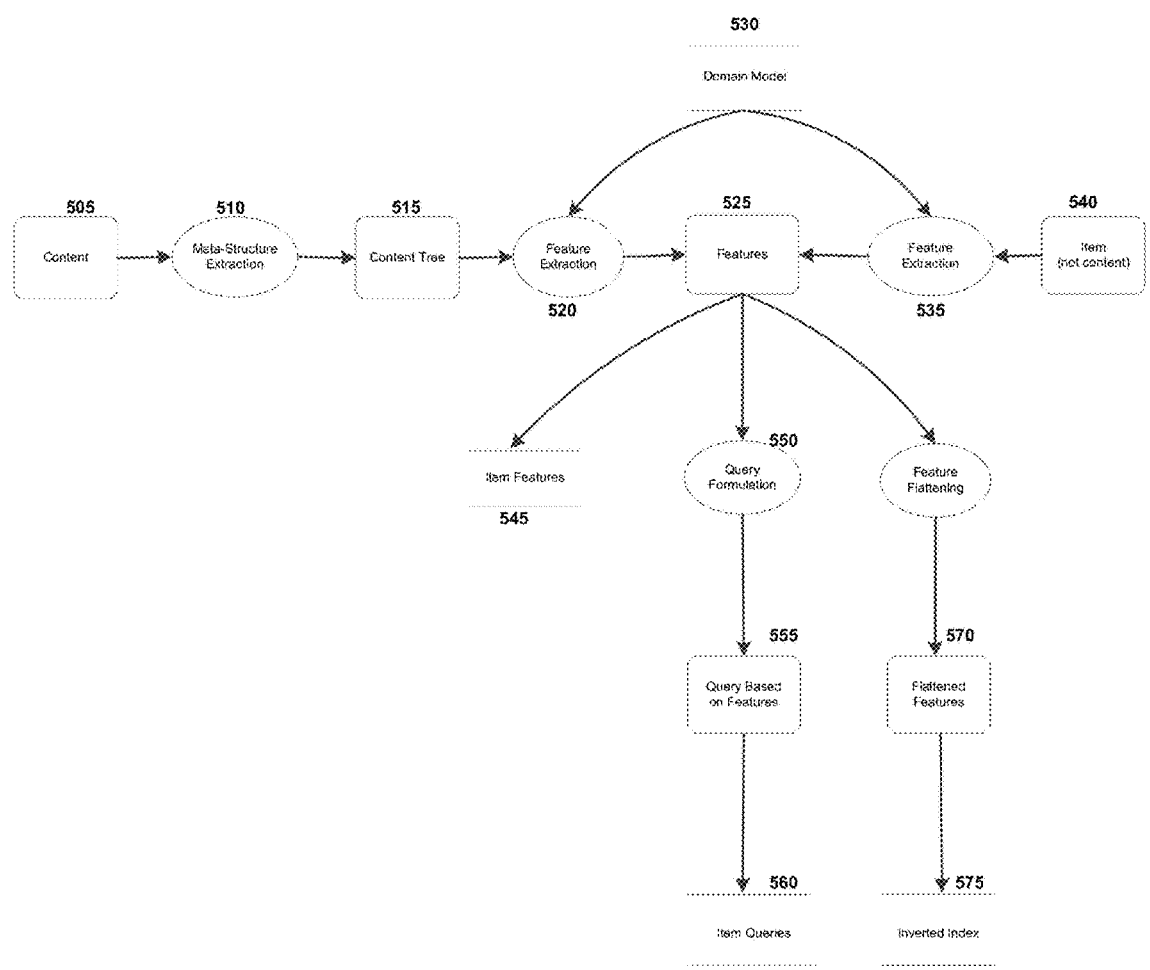
FIG. 5 is a flow chart describing processes used to implement various embodiments of the invention.

FIG. 5 illustrates a process for extracting and analyzing content to determine the proper extensions that are to be applied to native content. As described herein, content 505 may be any native content such as Web content or the content shown on screens of a user interface in native mobile applications. As necessary, the system may decide to perform an extraction and analysis of parts or all of the native content. For example, in the case of HTML content, extraction may occur on every page or per unit of time or based on a determination that the content has changed, such determination taking into account all the native content or only portions of the native content that are of interest.

The extraction is performed using one or more extraction strategies. These strategies may be based on multi-level heuristics driven by both semantic and non-semantic content attributes. For example, in the case of HTML content, elements of layout and style may be used to determine the relative importance of different sections of the content. Physical layout (as rendered on the client as opposed to as represented in the DOM) proximity may be used as a contributing measure of logical/semantic proximity. In some cases, metadata from sources such as URL parameters, META tags, Open Graph elements, microformats/microdata, data attributes, and/or CSS classes are considered. Multiple extraction strategies may operate serially or in parallel, with or without coordination, and may use data from external services. They may also add metadata directly to the native content in a manner that is discoverable by, for example, insertion strategies or extension logic. Which set of extraction strategies operates on the client at any one time may be determined by a number of factors such as the type of client device, the client application, the type and origin of content. For example, the web page shown in FIG. 3, the extractors may include general-purpose (non-semantic) content extractors as well as extractors tuned to certain metadata standards related to recipes such as hRecipe, http://schema.org/Recipe or http://www.data-vocabulary.org/Recipe/. This may be the result of configuration or automatic learning behavior by the system driven by, for example, machine learning and classification sub-systems that identify the URL of the page as belonging to a pattern of URLs having recipe-related content.

In certain implementations, the extraction strategies operating on the client use metastructure extraction heuristics 510 to break the content into sections that may or may not map directly to the content structure in the client (DOM for HTML content or some type of view object graph for GUI applications) but that typically have pointers back to the areas(s) of content from which they originate. The general form of the data structure is a directed graph but the graph may be reduced to a content tree 515 to account for the hierarchical nature of the native content. The content tree 515 contains both semantic and non-semantic information, and the extraction strategies used to analyze the content may be powered by external data. For example, an extraction strategy may identify likely recipe ingredient lists in arbitrary HTML content, even if the content had very little structure, e.g., if the ingredients were entered with no separating markup or with inconsistent markup, including such that they appeared on different levels of depth in the DOM. The extraction strategy uses several lower-level strategies to counteract the effects of poor or no structure, followed by a traversal of the content using a scoring algorithm that assigns higher scores to sections with closely located short content that might indicate an ingredient list. After the scoring phase, potential ingredient sections are identified as adjacent sections with high scores. This is an example of an extraction strategy tuned to a very prevalent yet difficult to identify semantic type. Other strategies may perform more rudimentary content extraction, such as grabbing all the text without markup from HTML content, or a more intermediate content extraction process where text is grabbed from visible controls in a GUI application while maintaining hierarchical relations among the native content elements and considering that certain controls contain information about semantically similar (and often repeating) elements. In some cases involving mobile applications, an extraction strategy may be able to access the data source of a view component and, through introspection APIs, may be able to extract useful information about field names, types and content.

In some embodiments of the invention the content tree may include information specific to the native content as viewed on a particular client device in a particular application with a particular viewport size. This information is useful to create expectations about the position and visibility of certain parts of the native content in certain situations. This information may then be combined with analytics information about the behavior of the content extension system to facilitate dynamic optimization of slot definitions and display item insertion.

In some embodiments the native content is extracted more than once for different content generation parameters (for example, URL parameters, in the case of Web pages), users, geographies, devices, etc. and over time in order to determine which parts of the content remain stable and which parts of the content vary and, to the extent possible, the contributing factors to the variations. In various embodiments this may happen manually or via supervised or unsupervised learning mechanisms.

The content tree may include information that indicates when parts of the content have changed. The change tracking process may execute on the client based on data derived from the content tree(s) from a subset of previous extractions or it may execute on the server, typically based on a time-based or randomized trigger. An example mechanism for change detection includes section level fingerprints, such fingerprints being, as determined by requirements, fragile, such as MD5 or SHA-1 hashes, or robust/fuzzy, such as data structures that can serve as inputs to fuzzy string matchers or location-sensitive hashing functions. In some embodiments of the invention change detection data structures span more than one section of the native content.

The content tree may be used as input into a feature extraction process 520 for enhancing the level of metadata available about the native content and to potentially eliminate unnecessary information. Feature extraction from content 505 may use domain models 530, which are data structures that contain information relevant to the content of the domain. In one particular embodiment of the invention, the domain model is structured as a generalized directed graph having, in certain cases, two types of edges: domain-specific edges and domain-independent edges. Domain independent edges provide information that is useful in abstracting feature extraction logic in a domain-independent manner. For example, in a health domain, the graph node for certain branded pain relievers may be connected to a graph node for acetaminophen by an edge whose meaning is "has as an active ingredient," which has a meaning specific to the health domain. At the same time the branded pain reliever node may be connected to the acetaminophen node via another edge whose meaning is "acts identically to," which is a domain-independent meaning Embodiments of the invention provide mechanisms by which domain-independent edges may be added based on domain-specific edges in a systematic, ongoing process. In another example, the nodes for two phrases could be linked by an edge that indicates statistical co-occurrence under certain conditions.

As with content extraction, the feature extraction process may involve multiple feature extraction strategies, in some ways selected by the information in the content tree and other contextual information. The output of the feature extraction process is a graph of features, which are the parts of native content that extensions can target and/or relate to at various levels of granularity, including raw content, terms and/or semantic elements.

Items 540 are another source of features. "Items" refers to data different from the content which is typically part of extension content and/or engagement units and may include, for example, offers such as national and local coupons, e-commerce and affiliate offers, information about sales at local stores, branded content such as sponsored recipes or health articles, targeting keywords, ads, links and other elements that may influence the extensions, and generate display items and engagement units. It should be pointed out that it is not required that display items be generated. Instead, display item generation may occur using extension logic external to the system implementing the methods of the invention, and this operation may be functionally distinct from content selection, placement and optimization of extension content. Features are extracted from different item types using feature extraction strategies 535 that may or may not have overlap with the feature extraction strategies for content.

In some embodiments of the invention, features can have three separate logical representations. The first is as per-sisted features 545, typically in one or more types of key-value stores such as HBase or MongoDB. The second is as one or more queries 560 that can be used to find items relevant to a subset of the features. Queries may or may not be persisted but typically are associated with advanced caching strategies. Queries are formulated by query building strategies 550 that generate queries based on subsets of features 555. Query building may happen online, offline or both. One difference between queries based on features 555 and the potentially cached and/or persisted item queries 560 is in the potential level of fidelity. For example, in some cases queries for finding relevant items to show as extended content may be only fully specified online, at runtime, based on request context, e.g., geolocation information or user history/preferences.

Just as content and items can have a set of queries related to their features, they may also provide data that is used to generate display items. As such, information derived from the item features may be organized as one or more inverted index(es) 575 such that one or more search engines can find and potentially score the relevance of the item in relation to queries. Since some search engines struggle with graph or tree data, the features may undergo a process of flattening 465 and further processing and transformation to generate the flattened features 570 that are added to the inverted index of the search engine.

In an alternative embodiment of the invention, the alerting or percolation capabilities of a search engine are used to generate queries to find display items for insertion into the extension slots. In this embodiment, rather than running queries based on content features against an index of items, data (typically text) based on subsets of content features is evaluated against queries generated from item features. Both mechanisms ultimately rely on similarity matching calculations involving operators of different types: text, Boolean, range, etc.

A dynamically optimizing system for extending native content that may have a choice of many possible extension types, which may generate display items with different look and feel based on the same item data, which may, in turn, be placed in many possible slots using many different insertion strategies needs to carefully balance exploration (trying new things) with exploitation (optimizing based on its objectives). Essentially, the challenge is balancing the automation of exploration with what makes sense for display to human users. Consider the example of having an option of placing extension content to the left or to the right of recipe ingredients (FIG. 3 shows an example of two extensions to the right of the first two ingredients). Without any constraints, the system, to which the two choices may carry no meaning, may choose to place one icon and text to the left of an ingredient and another icon and text to the right of another ingredient. Technically speaking, this is a valid form of exploration and, over time, a well-engineered approach may "learn" that using insertion strategies consistently (either to the left or to the right) is better than using them in combination, which may lead to a jarring and confusing user experience. However, during that experimentation process, the system may have caused a meaningful negative externality in the form of confused and/or upset users to whom the behavior, from a human standpoint, is construed as a form of error or failure. These types of situations are rarely seen in current practice because content extension typically happens per slot with slot-level decisions being made independently. One of the key advantages of the invention described herein is the coordinated management and optimization of content extension in a scalable and automated manner. In order to minimize the potentially negative side effects of certain kinds of experimentation associated with dynamic optimization, the use of a placement strategy mechanism reduces the set of possible choices to a set of acceptable choices. In the case of considering the left and right insertion strategies for ingredients, the definition of acceptable may be that all ingredient-level extensions use the same insertion strategy and, further, that the choice should be made once per user session. Other logical restrictions that may be imposed by a placement strategy include limiting the types of user experience experimentation, e.g., font type, font size, button color, etc., per page or per session. Yet another type of restriction may apply to the types of display items that are placed into slots and the factors that determine how the relevance of a display item to a particular slot in some particular native content is determined.

An example of a hierarchical placement strategy for the content illustrated in FIG. 3 is shown below:
1. Only apply this placement strategy if the native content includes
    1.1. >=1 recipe
2. Only apply this placement strategy for
    2.1. Desktop browsers
    2.2. Tablet browsers
3. Do not use behavioral targeting (browsing history) when evaluating display item relevance
    3.1. Unless specifically instructed otherwise below
4. Do not target the following types of user-generated content
    4.1. Comments
    4.2. Reviews
    4.3. Forum/group posts
5. Ignore display items with
    5.1. relevance_score<0.45 AND
    5.2. user_engagement_score<75
6. You may choose to delay work related to slot targeting and/or extension content display unless:
    6.1. There is greater than 80% chance that a slot is visible OR
    6.2. The slot is within 200 pixels of the edge of the viewport OR
    6.3. The slot is within 500 pixels of the edge of the viewport and the user has started scrolling towards the slot
7. Pick one of the available UI themes and maintain it consistently throughout the session.
    7.1. Unless otherwise provided by the UI theme
        7.1.1. Use a fade-in effect when showing display items on modern browsers
            7.1.1.1. With 1 second delay
                7.1.1.1.1. after content renders OR
                7.1.1.1.2. after the user stops scrolling
8. Pick one insertion strategy per slot type and maintain it consistently throughout the session.
9. If there is an externally provided limit to the maximum number of slots with extension content under the management of the system (perhaps via agreement with a large publisher), enforce this limit.
    9.1. Otherwise, ensure that no more than five content extensions under the management of the system are visible at any one time within the user's viewport.
10. In the item type offers include
    10.1. grocery and convenience store coupons
    10.2. grocery store circular information
    10.3. e-commerce and affiliate offers related to the groceries and specialty foods categories
    10.4. any other offers tagged with food
11. Enable the following potential extensions to the native content:
    11.1. For every recipe in the native content
        11.1.1. You may create a slot related to the recipe title
            11.1.1.1. Where you may insert
                11.1.1.1.1. Sponsored content from brands
            11.1.1.2. Using the insertion strategies
                11.1.1.2.1. after
            11.1.1.3. Using the following to identify relevant display items
                11.1.1.3.1. The recipe title
                11.1.1.3.2. Search query information
        11.1.2. For every ingredient in the recipe
            11.1.2.1. You may create a slot related to the ingredient
                11.1.2.1.1. Where you may insert
                    11.1.2.1.1.1. Sponsored content from brands
                    11.1.2.1.1.2. Ads
                    11.1.2.1.1.3. Offers
                11.1.2.1.2. Using the insertion strategies
                    11.1.2.1.2.1. icon left
                    11.1.2.1.2.2. icon right
                11.1.2.1.3. Using the following to identify relevant display items
                    11.1.2.1.3.1. The ingredient text
        11.1.3. You may create a slot related to all recipe ingredients
            11.1.3.1.1. Where you may insert
                11.1.3.1.1.1. Sponsored content from brands
                11.1.3.1.1.2. Ads
                11.1.3.1.1.3. Offers
            11.1.3.2. Using the insertion strategies
                11.1.3.2.1. after
            11.1.3.3. Using the following to identify relevant display items
                11.1.3.3.1. The recipe title
                11.1.3.3.2. Search query information
                11.1.3.3.3. Any of the recipe ingredients
        11.1.4. You may create a slot related to the entire recipe
            11.1.4.1. Where you may insert
                11.1.4.1.1. A third party related content extension OR
                11.1.4.1.2. Recipe items with relevance_score>0.7
                    11.1.4.1.2.1. Sponsored recipes
                    11.1.4.1.2.2. Related recipes with
                        11.1.4.1.2.2.1.1. rating==nil OR
                        11.1.4.1.2.2.1.2. rating>=70%
                    11.1.4.1.2.3. Popular recipes
            11.1.4.2. Using the insertion strategies
                11.1.4.2.1. after (instructions)
            11.1.4.3. Using the following to identify relevant display items
                11.1.4.3.1. The full recipe text
                11.1.4.3.2. Search query information Elements (1) and (2) show examples of placement strategy selection based on context. In the case where multiple placement strategies apply, the system evolves towards an optimal choice over time. Elements (3) and (4) show examples of broad targeting restrictions. Element (5) shows an example of the system considering the disutility of showing irrelevant or poorly engaging content to users. This is only possible because of the ability to manage dynamic slots and to decide not to actualize slots and leave them empty. Element (6) shows an example of dynamic extension coordination and how it facilitates decreased resource consumption of the system on both the client and the server, which has dual benefits to user experience (including factors such as mobile bandwidth costs and battery life) and reduction in operating expenses for system operators. Element (9) shows an example of optional global static constraints on slot actualization as well as dynamic constraints related to the specific native content as well as the ways in which a user may interact with it. Element (10) shows an example of relevant content restrictions that are orthogonal to other targeting rules. This allows for more complex and finely-tuned system behavior with less reliance on configuration and custom development.

Element (11) shows examples of how the targeting of extension content works. A typical pattern may involve identifying a portion of the native content or a place in the native content, the possible insertion strategies that may be applied relative thereto, the key factors that contribute to relevance calculations and the types of display items (and in some cases, content extensions) that may be used. It is important to note that the placement strategy need not identify the specific logic (script, component, etc.) that generates display content. If there is more than one choice based on the type of item that should be displayed and the insertion strategy limitations (e.g., icons must be small, etc.) then the system determines which of the choices is optimal for certain situations. Second, in some cases, (e.g., 11.1.4.1.1), the system may delegate responsibilities to a third party extension, if it determines that this is the optimal choice. Third, in the case of allowing "Ads" to be inserted, there is no specification as to whether this involves the ads being managed as items by the system or whether the system may interact with third party ad services such as an ad exchange. This aspect of system behavior is left unspecified on purpose so that the system has an opportunity to optimize at it sees fit.

The above example shows how a placement strategy may contain configuration and/or rules and/or logic of many different types that, together, enable system behavior that converges on optimal behavior while maintaining high quality of user experience and minimizing the negative externalities of poor user experience caused by factors such as inconsistent UI and irrelevant display items. By the nature of their flexibility and their ability to be applied to only certain cases of native content in certain contexts, placement strategies are also a key mechanism for complying with unique and important requirements imposed by stakeholders such as advertisers, regulators, publishers and application owners.

Placement strategies may be combined to create new ones. Some aspects of the placement strategy in the above example are specific to the type of targeted content (recipes) and can be reused to target recipes almost anywhere. Other aspects may be general enough to be applied anywhere, such as (8) regarding picking one type of insertion strategy per slot type per session.

When the decision about which display items should be shown in which slots is made on the server, the server sends the client a placement instruction, which requests the activation of the encapsulated extension logic and causes it to generate a display item in a slot (identified by an insertion strategy) subject to a set of conditions. The placement instruction identifies, for example, a place or places within the native content relative to which an insertion strategy will execute with sufficient precision such that the client either executes the placement instruction or determines that it cannot meet the precision parameters and responds appropriately. In one embodiment, this occurs as a two-step process. Each feature is related to one or more sections in the content tree and each section or node in the content tree contains information that is specific to the type of client application (browser or GUI/mobile app). In some instances it will also identify the type of native content and other factors that that would ensure that the client can either identify the right placement or not, due, perhaps, to a change in the native content.

In one embodiment, the client logic builds portions of the content tree as if it were performing an extraction in order to create an equivalent data structure to one residing on the server. In such cases, the server sends information about the relevant node(s) of the content tree such as their IDs or fingerprints to the client where they are compared to the client's version. In another embodiment, the client builds a data structure as part of the content tree that specifies how to get to a specific part identified by the content tree without having to build any part of the content tree itself. One such data structure could be a jQuery selector that identifies the node(s) or another representation of a traversal path to the node(s) of interest. It is desirable to make this data structure robust such that it identifies the node(s) correctly even when parts of the native content that have not relevant to the execution of a placement instruction have changed. This is achieved, for example, by starting with the most specific path and reducing it to the point where it can be reduced no further while still matching the node(s) of interest and only the node(s) of interest. In addition to identifying the node(s), the content in the node(s) needs to be consistent with the server's placement request. This may be achieved using content fingerprint checking or searching for certain substrings or other mechanisms.

When the client cannot be certain that it can execute the intent of the placement instruction given its constraints, the specific placement instruction (or in some cases all placement instructions) may be ignored in order to minimize the risk of extending the native content based on incorrect information. If the cause of the inconsistency is that the native content has changed unexpectedly, then the processing of placement instructions may stop. Otherwise, if the reason is, for example, that placing the display item may cause an unexpected layout change that is deemed visually undesirable, then only the affected placement instruction is halted and fallback behaviors such as targeting a different slot may be initiated.

Either way, the client typically notifies the server of the unexpected conditions and may receive additional instructions, e.g., to perform a subsequent content extraction and analysis. In order to prevent the case of attempting to continually extract and analyze native content that changes frequently, such as the search results page of a site, certain heuristics may be used. For example, the extraction rate for any one content resource may be throttled, and/or detection may be limited to the cases of truly dynamic content. In some embodiments, the result may be to extract multiple dynamic versions of content, e.g., multiple versions of a search result page with different search query parameters. In other embodiments, a decision may be made not to target the native content or to target it using just-in-time extraction, which is typically done on the client. Yet in other embodiments, the decision may be to target not based on the text of the native content but based on other attributes such as the query parameter in the case of the search result page. These different strategies may be combined to achieve the desired effect.

As shown in the placement strategy example, one or more of the conditions associated with a placement instruction may be related to aspects of time, the particular rendering of native content in a client with a particular viewport size and/or user actions such as scrolling. In these cases client-side event triggers may be configured to fire when the appropriate condition for activating extension logic or making already rendered display item(s) visible is met. In some cases, the extension logic may be capable of handling these types of conditions itself. The system may discover this via convention and/or configuration and may delegate responsibility to the extension logic.

In the case where extension logic indicates presentation of a display item to a user, it may be the case that the total set of parameters that govern the exact look and feel of the display item may have been specified by many different attributes from various sources. For example, a UI theme may have been picked by the placement strategy. An item to display may have been picked without knowledge of the specific UI component that will be used to render it. Some aspects of the UI component's properties may have been specified by an active either/or or multi-choice test, while others could be left unspecified (leaving room for the system to optimize amongst available choices or for the UI component to provide meaningful defaults). This gradual restriction of parameters that determines the look, feel and/or behavior of display items is in marked contrast to conventional approaches that utilize single-step parameterization.

In some embodiments, one of the capabilities that contributes to the abovementioned flexibility is the discovery services exposed by UI components. These discovery services enable quick runtime determinations of the relationship between UI components, display item types and aspects of context such as the native content of a site. A UI component may be configured to only display certain types of content on a subset of web sites or based on other criteria related to user profiles or any other type of context information. In effect, UI components primarily designed to execute on the client have a limited server-side lifecycle and execution abilities related to discovery and identifying fit or processing that may be supported by system services based on component configuration or actually involve executing some component logic server-side.

The dynamic optimization capabilities may be generalized as a four-step process. In the first step, the set of all possible choices of display items is reduced to the set of relevant/valid choices. This may happen implicitly by convention, explicitly through code, via binary or scored relevance similarity matching algorithms executing in a search engine, via database queries or by some other mechanism. In the second step, the value of the valid choices is determined using a function that takes as inputs attributes of a valid choice and attributes of context, including historical system and user behavior. In the third step, a suitable constrained optimization technique is applied to determine the winning choice(s). In the case where only one choice is needed and there are no constraints, the maximum value from step 2 may be returned.

An example may be an optimal targeting of advertising content extensions (ads) based on relevant keywords. Similar to search advertising systems such as Google AdWords, some embodiments of the invention may have simple advertiser models where an advertiser has an account, an account has zero or more campaigns, a campaign has zero or more ad groups and an ad group exists to join together zero or more keywords with zero or more creatives (ads). Keywords may have different matching strategies, which determine under which conditions they are considered to be a good match. In contrast to current practice, in the techniques described herein, the creatives may have much richer data model and behavior to match the many different item types that may evolve into display content. One difference is that, while conventional approaches treat the target of an ad as a URL or a simple URL template, the target of a creative using this inventive approach may be a URI such as a URL or a link as described above. The target may also identify an item, without information about how it is rendered, and/or be associated with logic that executes at various points in the content targeting lifecycle to determine the target and its parameterization dynamically.

The following discussion further restricts the above example to the case where the display items are to be inserted into Web content based on results of a search engine-based backend. In such a case, subsets of the features of the native content, as determined by an appropriate placement strategy, combined with attributes of context (native content attributes, user attributes, geolocation, etc.) are used to create queries that search the search engine's index for relevant keywords and/or keyword/creative pairs, depending on implementation choice, where each instance of a keyword or keyword/creative pair is per ad group, per campaign and per account. A minimum relevance score and/or a top N query restriction may be applied to restrict the number of search results. The search results are the set of relevant choices of display content. The value of a keyword or keyword/creative pair may be correlated to the relevance score but is not necessarily driven by it. Instead, the value is based on a combination of some party's willingness to pay for certain user action(s) and the likelihood of the choice leading to the type of user engagement/behavior that results in the user action(s) that trigger payment. Non-monetary aspects such as long-term user satisfaction and fairness may also be considered. Specific value calculations may also vary significantly based on whether payments happen per click or per conversion at a future date. What is clear is that accurate estimates of value depend on many factors beyond the relevant choice. In some cases, contextual multi-armed bandits are used because of their ability to bridge historical data about observations in different contexts to the need to estimate value based on limited or no historical data in the current context. The result of step 2 is the relevant items form step 1 with associated values. In step 3 a dynamic optimization is performed to maximize value subject to constraints, which come from two primary sources: (a) limited campaign budgets and (b) placement strategies. In the case of simple value maximization subject to limited budgets, there are a number of standard solutions, for example, using problem representations in the submodular welfare maximization or bipartite graph matching paradigms. These algorithms may be generalizable to certain page-based allocation constraints.

Embodiments of the invention utilize a dynamic optimization algorithm that may be tuned per unique set of constraints created by a placement strategy to improve the chances of optimal system behavior, such that the output of step 3 is the choices of display items selected for placement. In some embodiments these choices may need additional information in order to satisfy the information model requirements of generating a placement instruction. For example, in the case where the search engine returns keywords only, a creative from the same ad group as the keyword is selected. Independently, if the creative's target does not specify the extension logic such as a UI component that would generate the display item then a UI component may need to be determined based on the restrictions imposed by the context, the placement strategy, the campaign and the creative's target. In some embodiments the choices are made using the four-step optimization pattern described above. In step 4, the results of user and system behavior relative to the placement choices (selection, clicking, non-interaction, mouse-over, etc.) are fed back in a feedback loop via an analytics engine, thus providing historical information that may be used to tune future predictions of relevant display items, in some cases in real-time such that the items change as the user is viewing the content.

Figure 6:
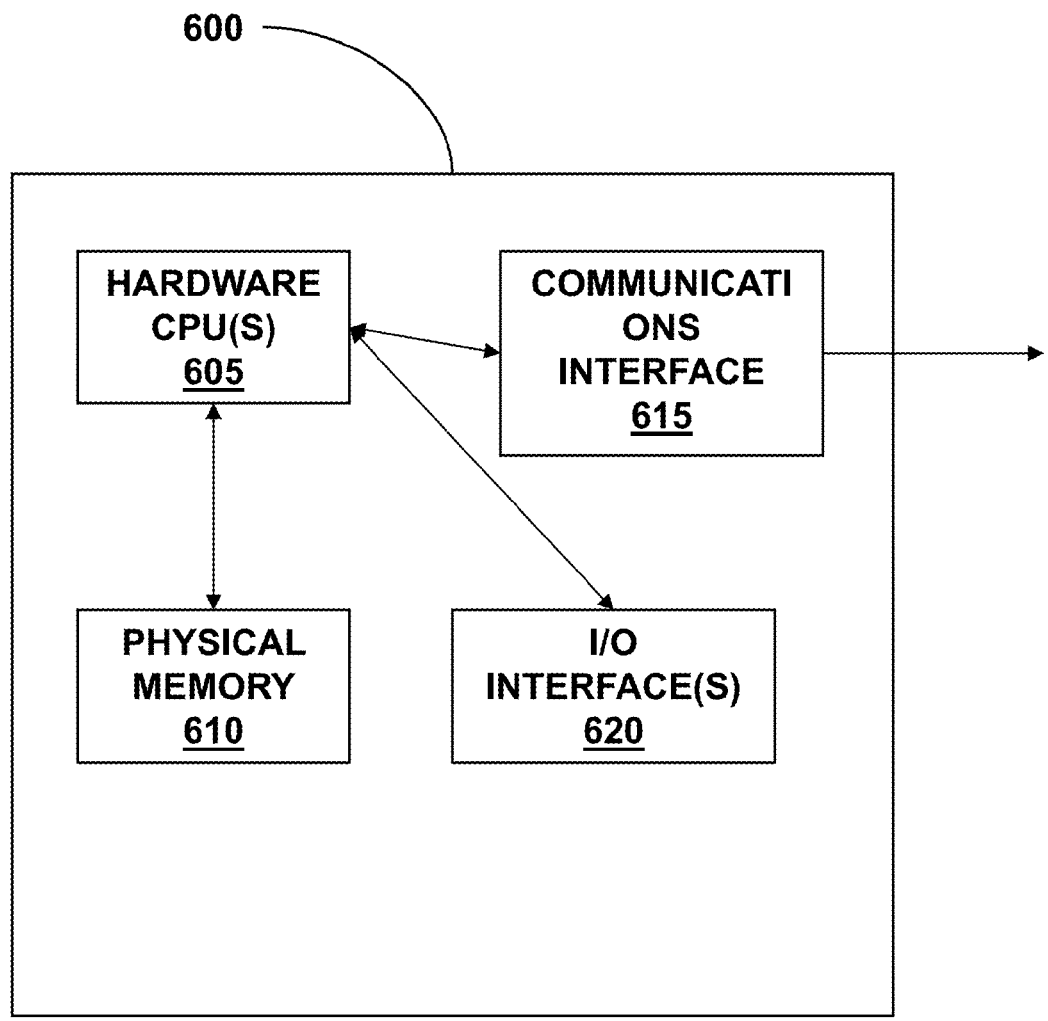
FIG. 6 is a schematic illustration of a computer storage and processing device on which various embodiments of the invention may operate.

Referring to FIG. 6, those skilled in the art will appreciate that various implementations of the invention may be practiced with various computer system configurations, including hand-held wireless devices such as mobile phones or personal digital assistants (PDAs), multiprocessor systems, microprocessor-based or programmable consumer electronics, minicomputers, mainframe computers, and the like.

The invention may also be practiced in distributed computing environments where tasks are performed by remote processing devices that are linked through a communications network. In a distributed computing environment, program modules may be located in both local and remote computer storage media including memory storage devices.

In some cases, relational (or other structured) databases may provide data storage and management functionality, for example as a database management system or database server which stores data related to the services and consumers utilizing the service. Examples of databases include the MySQL Database Server or ORACLE Database Server offered by ORACLE Corp. of Redwood Shores, Calif., the PostgreSQL Database Server by the PostgreSQL Global Development Group of Berkeley, Calif., or the DB2 Database Server offered by IBM.

The computer system may include a server device 600 in the form of a computer including a processing unit 605, a system memory 610, and a system bus that couples various system components including the system memory to the processing unit.

Computers typically include a variety of computer readable media that can form part of the system memory 610 and be read by the processing unit 605. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, or another operating system of platform.

At a minimum, the memory 610 includes at least one set of instructions that is either permanently or temporarily stored. The processor 605 executes the instructions that are stored in order to process data. The set of instructions may include various instructions that perform a particular task or tasks. Such a set of instructions for performing a particular task may be characterized as a program, software program, software, engine, module, component, mechanism, or tool.

The system may include a plurality of software processing modules stored in a memory as described above and executed on the server 600. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, RUM and/or JavaScript, for example. Further, it is not necessary that a single type of instruction or programming language be utilized in conjunction with the operation of the system and method of the invention. Rather, any number of different programming languages may be utilized as is necessary or desirable.

The computing environment may also include other removable/non-removable, volatile/nonvolatile computer storage media. For example, a hard disk drive may read or write to non-removable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID integrated circuits, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner via, for example, a communications interface 615. Additionally, it is appreciated that each of the processor and/or memory may be composed of different physical pieces of equipment.

A user may enter commands and information into the computer through one or more user device interfaces 620 that communicate with input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices (not shown) may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Although internal components of the computer are not shown, those of ordinary skill in the art will appreciate that such components and the interconnections are well known. Accordingly, additional details concerning the internal construction of the computer need not be disclosed in connection with the present invention.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology.

What is claimed is:

1. A system for dynamically placing display items for presentation within native content being displayed within a content structure on a client device, the system comprising:
    at least one memory unit for storing computer-executable instructions; and
    at least one processing unit for executing the instructions stored in the memory, wherein execution of the instructions results in:
        the dynamic extension of the native content by creation of at least one content display slot for inclusion within the native content provided by a content provider at which different display items may be incorporated into the native content upon rendering of the native content on the client device wherein the content display slot is not defined by the content provider in the native content and is based at least in part on an insertion strategy which considers attributes of the content structure of the native content and an optimized selection and placement of the display item relative to and based at least in part on the location and content of the native content;
        receipt, at the client device, the display item to be incorporated into the display slot placed within the native content flow, wherein the display item is based at least in part on results of the pseudo-query; and
        incorporation of the display item within the native content flow at the client device by inserting the display item into the content display slot.

2. The system of claim 1 wherein the attributes comprise content display attributes.

3. The system of claim 2 wherein the content display attributes comprise one or more of metadata, markup tags, or hyperlinks.

4. The system of claim 2 wherein the content display attributes comprise elements of a document object model of the content.

5. The system of claim 2 wherein the content display attributes comprise elements of a cascading style sheet of the content.

6. The system of claim 1 wherein the attributes comprise subject matter attributes.

7. The system of claim 6 wherein the subject matter attributes comprise one or more of text, keywords, metadata or images.

8. The system of claim 6 wherein the subject matter attributes comprise search engine content.

9. The system of claim 8 wherein the search engine content comprises a search query string entered at the client.

10. The system of claim 8 wherein the search engine content comprises a URI returned from a search query.

11. The system of claim 1 wherein execution of the instructions further identifies the attributes on the client device on which the content is to be rendered.

12. The system of claim 11 wherein the identification of the attributes occurs prior to the content being rendered on the client device.

13. The system of claim 11 wherein the identification of the attributes occurs after the content is rendered on the client device.

14. The system of claim 11 wherein the content is rendered virtually prior to incorporating the display items.

15. The system of claim 11 wherein the collection of content display and subject matter attributes occurs as the content is being rendered on the client device.

16. The system of claim 1 wherein the attributes are received from a remote server.

17. The system of claim 1 wherein the attributes are organized according to a hierarchical structure such that attributes inherit characteristics from parent attributes.

18. The system of claim 1 wherein the display items comprise one or more of user interface components, text, images, buttons, application objects, or hyperlinks.

19. The system of claim 18 wherein the display items comprise an advertisement.

20. The system of claim 18 wherein the display items comprise a definition.

21. The system of claim 1 wherein the display items incorporate attributes of the native content.

22. The system of claim 21 wherein the incorporated attributes comprise text, images or links from the native content.

23. The system of claim 1 wherein insertion of the display items into the native content transforms the native content.

24. The system of claim 23 wherein the transformation of the native content comprises changing one or more of the style, layout or content of the native content.

25. The system of claim 23 wherein the transformation of the native content comprises obfuscating of a portion of the native content.

26. The system of claim 1 wherein the content display slot is located within an atomic element of the content.

27. The system of claim 26 wherein the atomic element of the content comprises a user interface component, a bulleted listing, a numeric listing, a text fragment, a heading, a title, a subtitle, an image, or a hyperlink.

28. The system of claim 1 wherein the content display slot is located adjacent to an atomic element of the content.

29. The system of claim 1 wherein the content display slot comprises at least one content display attribute and at least one content insertion instruction.

30. The system of claim 29 wherein the at least one content insertion instruction comprises a temporal element.

31. The system of claim 30 wherein the temporal element describes a time at which the content display slot becomes active.

32. The system of claim 30 wherein the temporal element describes a time at which the content display slot becomes inactive.

33. The system of claim 29 wherein a plurality of content display slots are created for a collection of content.

34. The system of claim 33 wherein the collection of content comprises a single page of content.

35. The system of claim 33 wherein the collection of content comprises multiple pages of content within a single domain.

36. The system of claim 33 wherein the collection of content comprises multiple pages of content viewed during a single session.

37. The system of claim 33 wherein at least a subset of content display attributes are consistent among content display slots on the single collection of content.

38. The system of claim 29 wherein the at least one content insertion instruction comprises an activation element such that activation of the content display slot requires a user action at the client device.

39. The system of claim 38 wherein execution of the instructions further identifies the user action as an interactive screen action.

40. The system of claim 38 wherein the content insertion instruction is dependent upon the user's current view of the content.

41. The system of claim 38 wherein the content insertion instruction is dependent upon the client device on which the content is to be rendered.

42. The system of claim 29 wherein the at least one content display attribute comprises a maximum slot per page limitation.

43. The system of claim 29 wherein the at least one content display attribute comprises a maximum slot per screen limitation.

44. The system of claim 29 wherein the at least one content display attribute comprises a minimum distance between slots limitation, wherein the distance is measured in pixels.

45. The system of claim 29 wherein the at least one content display attribute comprises a minimum distance between slots limitation, wherein the distance is measured based on a path between content elements within a document object model of the content at which the content slots are to be inserted.

46. The system of claim 29 wherein the at least one content display attribute comprises a restriction on displaying the slot if presentation of the slot will cause a text flow disruption when the content is rendered.

47. The system of claim 29 wherein the at least one content display attribute comprises a restriction on the number of display items that may be visible at any one time, thereby limiting the number of simultaneously viewed display items.

48. The system of claim 29 wherein the at least one content display attribute comprises display coordination specifications such that the display of one display item at one display slot influences display attributes of another display item displayed at another display slot.

49. The system of claim 48 where the coordination happens per web page.

50. The system of claim 48 where the coordination happens across a single screen.

51. The system of claim 48 where the coordination happens across a single session.

52. The system of claim 29 wherein the at least one content display attribute is based on one or more user preferences.

53. The system of claim 1 further comprising collecting user attributes of a user operating the client device and incorporating at least one user attribute in the request for display items.

54. The system of claim 53 wherein the user attributes comprise demographic information about the user.

55. The system of claim 53 wherein the user attributes comprise historical activities of the user.

56. The system of claim 55 wherein the historical activities of the user comprise browsing activities.

57. The system of claim 55 wherein the historical browsing activities of the user are limited to a current browsing session.

58. The system of claim 53 wherein the user attributes contribute to the selection of display items, thereby selecting targeted display items to the user.

\* \* \* \* \*